(12) United States Patent
Vora

(10) Patent No.: US 9,826,605 B2
(45) Date of Patent: Nov. 21, 2017

(54) LIGHTING CONTROL SYSTEM AND METHOD

(71) Applicant: Sanjaykumar J. Vora, Elk Grove Village, IL (US)

(72) Inventor: Sanjaykumar J. Vora, Elk Grove Village, IL (US)

( * ) Notice: Subject to any disclaimer, the term of this patent is extended or adjusted under 35 U.S.C. 154(b) by 446 days.

(21) Appl. No.: 14/256,685

(22) Filed: Apr. 18, 2014

(65) Prior Publication Data

US 2015/0305115 A1    Oct. 22, 2015

(51) Int. Cl.
  *H05B 37/02* (2006.01)
  *G05B 15/02* (2006.01)
  *H05B 33/08* (2006.01)

(52) U.S. Cl.
  CPC .......... *H05B 37/029* (2013.01); *G05B 15/02* (2013.01); *H05B 33/0863* (2013.01); *H05B 37/0245* (2013.01)

(58) Field of Classification Search
  CPC .. G05B 15/02; H05B 37/029; H05B 33/0848; H05B 37/0236; H05B 37/0272; H05B 33/0863; H05B 37/0245; Y02B 20/42
  See application file for complete search history.

(56) References Cited

U.S. PATENT DOCUMENTS

| | | | | |
|---|---|---|---|---|
| 7,139,617 B1* | 11/2006 | Morgan | ............... | H05B 37/029 345/207 |
| 2004/0160199 A1* | 8/2004 | Morgan | .................. | A01M 1/04 315/312 |
| 2005/0024488 A1* | 2/2005 | Borg | ....................... | G06Q 30/06 348/36 |
| 2005/0097162 A1* | 5/2005 | Budike, Jr. | ............. | H04L 29/06 709/201 |
| 2008/0111500 A1* | 5/2008 | Hoover | .............. | H05B 33/0845 315/293 |
| 2008/0258633 A1* | 10/2008 | Voysey | .............. | H05B 37/0218 315/159 |
| 2008/0281472 A1* | 11/2008 | Podgorny | ............ | F24F 11/0009 700/276 |
| 2010/0030389 A1* | 2/2010 | Palmer | ................... | A01G 25/16 700/284 |
| 2010/0262297 A1* | 10/2010 | Shloush | ............. | H05B 37/0218 700/276 |

(Continued)

*Primary Examiner* — Sisay Yacob
(74) *Attorney, Agent, or Firm* — Erickson Law Group, PC

(57) ABSTRACT

A system and method of controlling lighting schedules in a lighting control application on a computer system is disclosed. A graphical user interface is displayed to a user on a display in signal-communication with the computer system. The graphical user interface has a plurality of lighting control schedule areas. Each lighting control schedule area has an in-schedule portion and a corresponding out-of-schedule portion. One or more interface objects, corresponding to one or more lighting control devices, are associated with the in-schedule lighting control schedule of a first lighting control schedule area of the plurality of lighting control schedule areas without instructing the corresponding one or more lighting control devices to operate on said in-schedule lighting control schedule, in response to a user moving the one or more interface objects to the out-of-schedule portion of the first lighting control schedule area.

20 Claims, 33 Drawing Sheets

(56) References Cited

U.S. PATENT DOCUMENTS

| | | | | |
|---|---|---|---|---|
| 2011/0004837 A1* | 1/2011 | Copland | ............... | G06F 3/0482 715/765 |
| 2011/0010019 A1* | 1/2011 | Shloush | ............. | H05B 37/0218 700/295 |
| 2011/0115413 A1* | 5/2011 | Erickson | .............. | H05B 37/029 315/312 |
| 2011/0178650 A1* | 7/2011 | Picco | ................. | H05B 37/0254 700/295 |
| 2013/0027412 A1* | 1/2013 | Roddy | ................. | F24F 11/0086 345/501 |
| 2014/0354170 A1* | 12/2014 | Gredler | ............. | H05B 33/0815 315/224 |
| 2015/0305106 A1* | 10/2015 | Vora | ................... | H05B 37/0272 315/291 |
| 2015/0305116 A1* | 10/2015 | Vora | .................... | H05B 37/029 315/292 |
| 2015/0305123 A1* | 10/2015 | Vora | ................... | H05B 37/0272 315/153 |

\* cited by examiner

LIGHTING CONTROL SYSTEM AND METHOD

FIELD OF THE INVENTION

This invention relates in general to lighting control systems.

BACKGROUND OF THE INVENTION

Lighting is used to illuminate a space or area. Lighting may be adjusted manually by operating a wall switch. Lighting intensity may be adjusted by manually operating a wall dimmer.

The present inventor has recognized that, when multiple lights are used across a large area or across multiple areas, it may become burdensome to go to each wall switch or dimmer to adjust the corresponding lighting. Therefore it would be desirable to control lighting from a central location or remotely from a remote computer or computing resource in the cloud.

The present inventor has recognized that when installing a lighting control device having a wireless communication feature it would be desirable for the lighting control device to be configured so that it does not remain connected to third party networks not having the corresponding lighting control application.

LED lighting has become increasingly used to light indoor and outdoor spaces. The present inventor has recognized that certain LED lighting does not dim constantly as perceived by the human eye when the power is reduced or increased at a constant rate through the total range of power. The present inventor has recognized that it would be desirable to provide a device having a dimming function that causes the lighting to dim a constant rate by adjusting the power, voltage, or current to the lighting at a non-constant rate.

The present inventor recognized it would be desirable to have a lighting control application that provided a more user friendly interface for creating and modifying lighting control schedules and sensory support. The present inventor recognized it would be desirable to manipulate objects corresponding to lighting control devices using a drag-and-drop feature. The present inventor recognized it would be desirable to automatically open and close new lighting schedules under certain circumstances.

A user may want to temporarily remove a light from a particular lighting schedule or sensor group and the present inventor has recognized that when a lighting control application has multiple schedules or sensors, moving devices out-of-schedules or sensor groups to a common out-of-schedule area makes it difficult for a user to know which device is associated with which schedule or sensor groups. The present inventor recognized it would be desirable for a lighting control application to create an association between a device and a schedule or sensor group even when the device is not operating on the schedule.

The present inventor has recognized that it would be desirable to centrally control devices for detecting battery power and light function in devices such as exit signs in order to report of low battery or light non-functioning conditions to a central location or from the cloud.

SUMMARY OF THE INVENTION

A method of controlling lighting schedules in a lighting control application on a computer system is disclosed. A graphical user interface is displayed to a user on a display in signal-communication with the computer system. The graphical user interface has a plurality of lighting control schedule areas. Each lighting control schedule area has an in-schedule portion and a corresponding out-of-schedule portion. The out-of-schedule portion corresponds to an out-of-schedule lighting control schedule comprising only one light intensity setting. The in-schedule portion corresponds to an in-schedule lighting control schedule comprising a plurality of light intensity settings. One or more interface objects, corresponding to one or more lighting control devices, are associated with the in-schedule lighting control schedule of a first lighting control schedule area of the plurality of lighting control schedule areas without instructing the corresponding one or more lighting control devices to operate on said in-schedule lighting control schedule, in response to a user moving the one or more interface objects to the out-of-schedule portion of the first lighting control schedule area.

In some embodiments, step of associating comprises the step of instructing the one or more lighting control devices corresponding to the one or more interface objects located in the out-of-schedule portion of the first lighting control schedule area to operate on a first out-of-schedule lighting control schedule when said one or more interface objects are moved into the out-of-schedule portion from the in-schedule portion of the first lighting control schedule area.

In some embodiments, the step of instructing comprises the step of sending an electronic scheduling message to the one or more lighting control devices corresponding to the one or more interface objects located in the out-of-schedule portion with instructions to operate on the out-of-schedule lighting control schedule.

In some embodiments, the step of instructing the one or more lighting control devices to operate on the in-schedule lighting control schedule of the first lighting control schedule area in response to a user moving the one or more interface objects to the in-schedule portion of the first lighting control schedule area.

In some embodiments, the step of associating one or more second interface objects, corresponding to one or more lighting second control devices, with the in-schedule lighting control schedule of a second lighting control schedule area of the plurality of lighting control schedule areas without instructing the corresponding one or more lighting control devices to operate on said in-schedule lighting control schedule in response to a user moving the one or more interface objects to the out-of-schedule portion of the second lighting control schedule area.

In some embodiments, step of associating is further defined in that at least one of the interface objects are moved into the out-of-schedule portion in response to a user entry of an ID into a text entry box, the ID corresponding at least one of the one or more lighting control devices.

In some embodiments, the step of associating is further defined in that at least one of the interface objects are moved into the out-of-schedule portion in response to a user selecting, dragging, and dropping the one or more interface objects into the out-of-schedule portion of the first lighting control schedule area.

In some embodiments, the step of associating comprises the step of associating all of the interface objects in the in-schedule lighting control schedule of the first lighting control schedule area with the in-schedule lighting control schedule without instructing the corresponding one or more lighting control devices to operate on said in-schedule lighting control schedule, in response to a user moving all of the interface objects to the out-of-schedule portion of the first lighting control schedule area, wherein the user moving all of the interface objects is accomplished by one user action.

In some embodiments, the method comprises the step of associating all of the interface objects in the in-schedule lighting control schedule of each of the plurality of lighting control schedule areas with the corresponding in-schedule lighting control schedule without instructing the corresponding one or more lighting control devices to operate on said corresponding in-schedule lighting control schedule in response to a user instructing to move all of the interface objects to the corresponding out-of-schedule portion of the corresponding lighting control schedule areas.

A lighting control computer system is disclosed. The system comprises a processor, a memory comprising a plurality of lighting control schedules, a display in signal communication with the processor, a graphical user interface display function, and an associating function.

The graphical user interface display function is stored on the memory and executable by the processor to display a graphical user interface on the display. The graphical user interface comprises a plurality of lighting control schedule areas. Each scheduling area comprises an in-schedule portion and a corresponding out-of-schedule portion. Each in-schedule portion corresponds to one of the plurality of lighting control schedules. Each out-of-schedule portion corresponds to an out-of-schedule lighting control schedule.

The associating function is stored on the memory and executable by the processor to associate one or more interface objects, corresponding to one or more lighting control devices, with one of the plurality of lighting control schedules without instructing the corresponding one or more lighting control devices to operate on said one of the plurality of lighting control schedules, in response to a user moving the one or more interface objects to the corresponding out-of-schedule portion.

Numerous other advantages and features of the present invention will become readily apparent from the following detailed description of the invention and the embodiments thereof, from the claims, and from the accompanying drawings.

DETAILED DESCRIPTION

Figure 1:
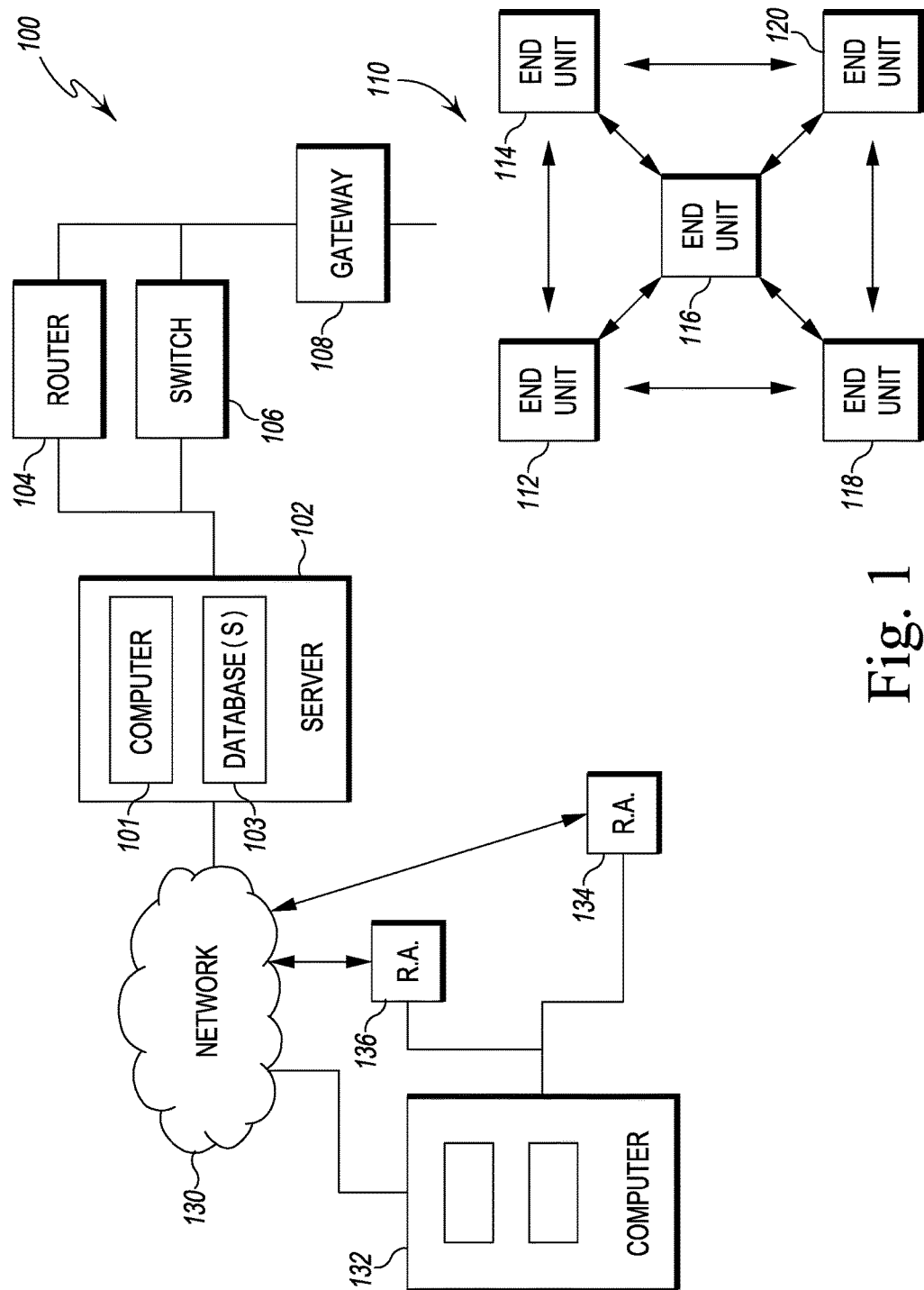
FIG. 1 is a diagram of an exemplary system architecture having the lighting control system of the invention.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Architecture

FIG. 1 shows an exemplary system architecture for the lighting control system 100. The system has an application server 102 connected to a gateway 108. The gateway is in signal communication with a wireless network 110. The wireless network comprises one or more end units 112, 114, 116, 118, 120.

The application server may generally be a computer having a processor signal connected to a memory and one or more network adapters. The computer may also comprise an operating memory, such as RAM, and a hard drive or solid state memory for longer term storage. The computer may also comprise an input device, such as a keyboard, an output device such as a monitor, and/or an input/output device such as a touch screen. In some embodiments, a user can remotely access the control application on the application server across a network, such as the Internet.

In some embodiments, the network 110 is a mesh network were each end unit can relay and route data from one end unit to the next end unit within range of that end unit's wireless transmitter/receiver. Also the end unit that is in range of the gateway can transmit or relay data to and from the gateway. Therefore an end unit need not be within the direct communication range of the gateway 108 in order to send data to the gateway. Instead data may be sent over a number of hops through intermediate end units to and from the gateway or a destination end unit. The mesh nature of the network 110 is shown in FIG. 1 by the arrows between the end units 112, 114, 116, 118, 120. However, FIG. 1 does not necessarily show all communication pathways between the end units 112, 114, 116, 118, 120, and additional routes may exist. As long as one end unit is within the wireless range of another end unit a pathway may be established there between.

In some embodiments, the application server 102 is connected to the gateway 108 via one of a network switch 106, a wireless router 104, a network cable, or other network. In some embodiments, the application server 102 is in communication with a remote computer or computing service 132 via a network 130, such as the Internet.

Gateway

Figure 2:
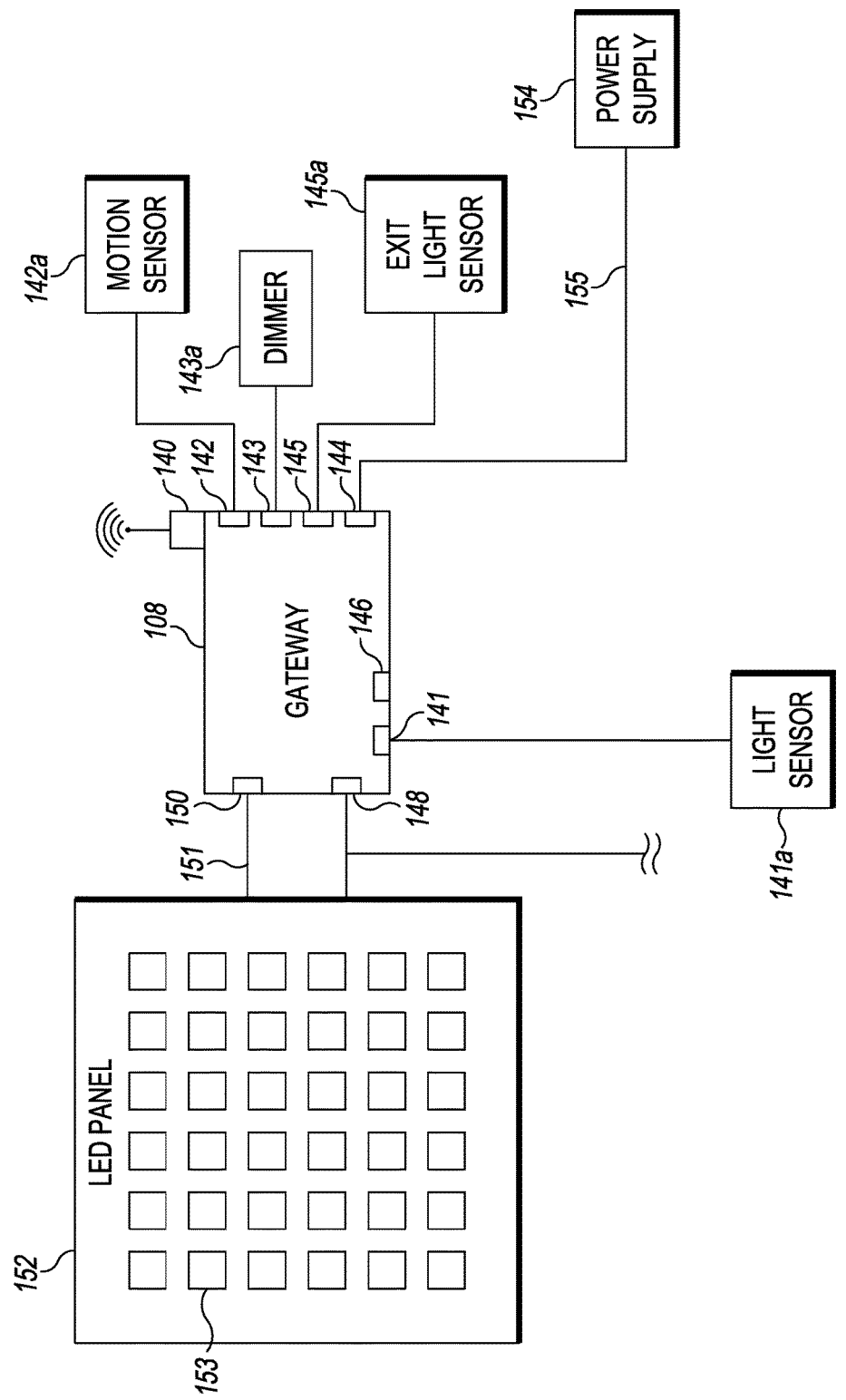
FIG. 2 is a block diagram of a gateway of the lighting control system of FIG. 1.

An exemplary gateway 108 is shown in FIG. 2 in block diagram form. The gateway is an electronic device having a processor (not shown), a memory (not shown), an application server side network port 148, and a wireless network adapter 140 capable of sending and receiving data in one or more wireless protocols.

In some embodiments, the gateway may also be capable of controlling and dimming a light source, such as a LED panel 152 having a plurality of LEDs 153. In such embodiments, the gateway has a power in port 144, a power out port 150. The gateway may also have a control port 146 for control signal dimming systems. In some embodiments, the gateway has one or more of a light sensor port 141, a motion sensor port 142, a wall dimmer port 143, an exit sense port 145, and other ports (not shown). The memory, wireless network adapter 140, and ports 141, 142, 143, 144, 145, 146, 148, and 150 are connected to the processor by a system bus, wires, and/or other electronic circuitry.

It will be recognized that the ports 142, 144, 146, 141, 148, 150, and the adapter 140 are shown diagrammatically in FIG. 2. The ports 142, 144, 146, 141, 148, 150, may be configured to receive a wired connection, such as a CAT 5 Ethernet cable connection. In some embodiments, the ports 142, 144, 146, 141, 148, 150, are wires extending from a circuit board within the gateway capable of being connected to corresponding external components. In some embodiments, the ports 142, 144, 146, 141, 148, 150 are either wires or receiving ports. It will further be recognized that the wireless network adapter 140 may be contained within the gateway housing and connected to an antenna that is located within the housing and/or extending outside of the housing.

End Unit

Figure 3:
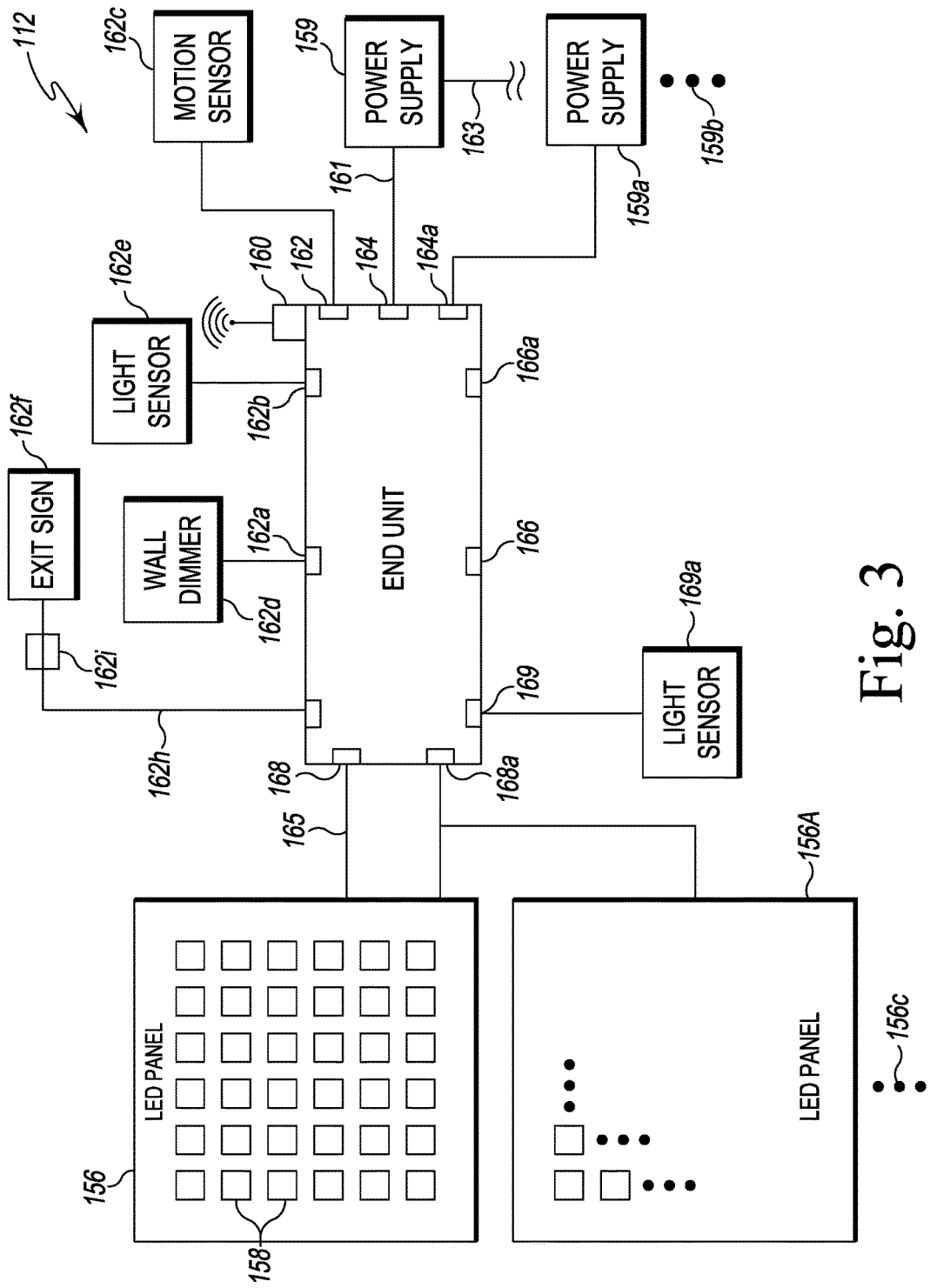
FIG. 3 is a block diagram of an end unit of the lighting control system of FIG. 1 connected to other components in a first configuration.
Figure 4:
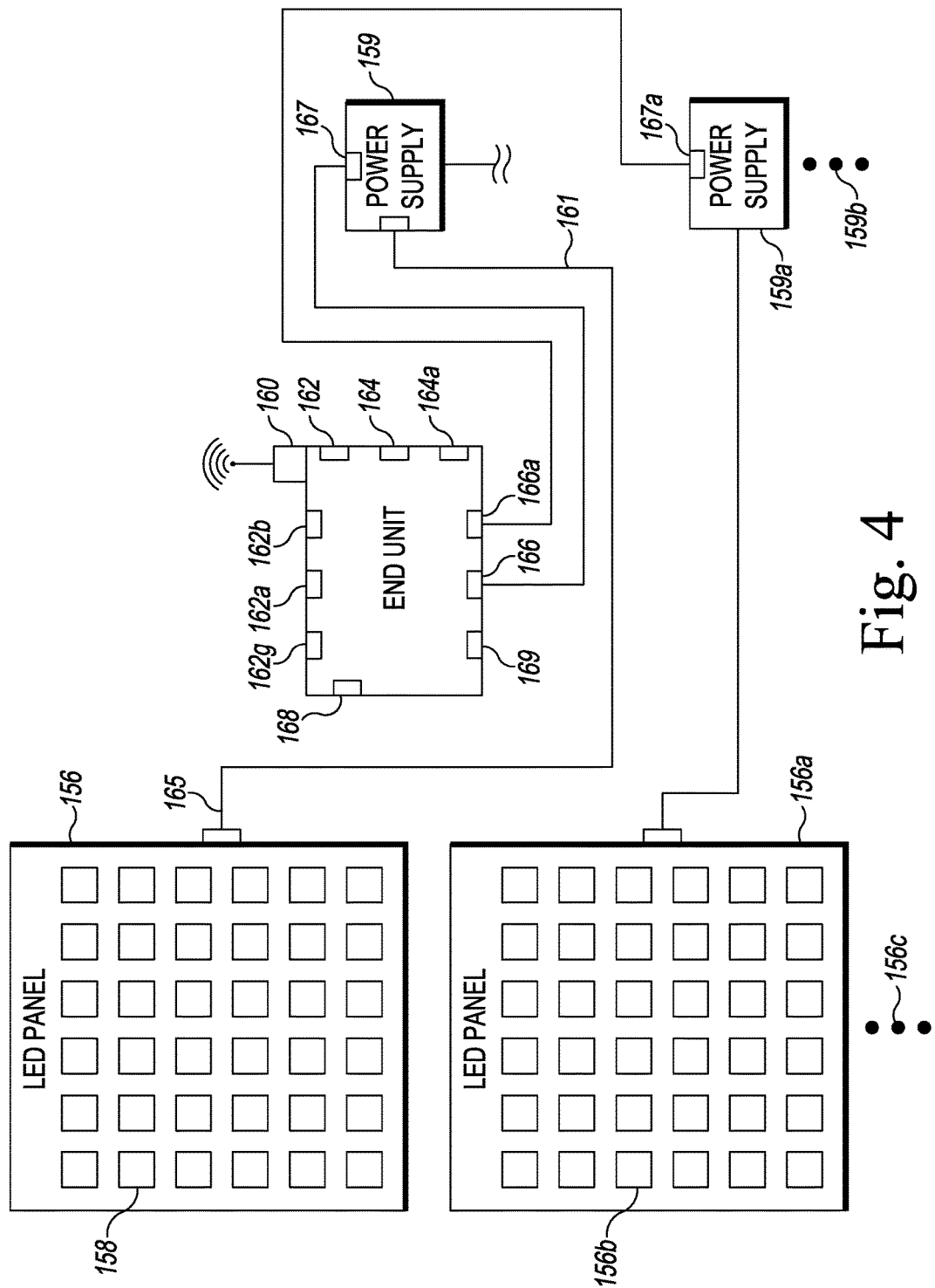
FIG. 4 is a block diagram of the end unit of the lighting control system of FIG. 1 connected to other components in a second configuration.

An exemplary end unit 112 is shown in FIGS. 3 and 4 in block diagram form. The end unit is an electronic device having a processor (not shown), a memory (not shown), and a wireless network adapter 160. In some embodiments the end unit has a first power-in port 164 and a first power-out port 168 for serial dimming arrangements as shown and explained regarding FIG. 3. In some embodiments, the end unit has a first control signal port 166 for control signal dimming, via a power supply 159, as shown and explained regarding FIG. 4. In some embodiments, the end unit has one or more of a light sensor port 169, a motion sensor port 162, a wall dimmer port 162a, and an exit sense port 162b. The memory, the wireless network adapter 160, and the ports 162, 162a, 162b, 164, 166, 168, and 169 are connected to the processor by a system bus, one or more circuit boards, wires, and or other electronic circuitry.

In some embodiments, the end unit and the gateway may comprise an application-specific integrated circuit (ASIC) having one or more processors and memory blocks including ROM, RAM, EEPROM, Flash, or the like; a programmed general purpose computer having a microprocessor, microcontroller, or other processor, a memory, and an input/output device; a programmable integrated electronic circuit; a programmable logic device; or the like. Any device or combination of devices on which a finite state machine capable of implementing the procedures described herein can be used as the end unit or the gateway.

The light sensor port 169 may be connected to a light sensor 169a. In some embodiments, the light sensor 169a is a fixture integrated daylight dimming photo sensor, sold under the brand name WattStopper and under the model number FD-301, by Legrand North America, Inc. of West Hartford, Conn., The light sensor may be any daylight dimming sensor producing a signal of between 0 to 10 volts DC from minimum to maximum, or any analog 0 to 10 volt DC signal. In some embodiments, the light sensor has a photocell or photoresistor, which changes its resistance when light shines on the photocell or photoresistor. In some embodiments, the light sensor comprises an active-pixel sensor, a charge-coupled device, a LED reversed biased to act as a photodiode, a photovoltaic cell, a photodiode, or a photomultiplier.

The motion sensor port 162 may be connected to a motion sensor 162c. In some embodiments, the motion sensor is a motion sensor sold under the brand name WattStopper and under the model number HB300W, by Legrand North America, Inc. of West Hartford, Conn. In some embodiments, the motion sensor has a light beam from a light source directed to a photosensor. When an object breaks the beam and the photos sensor detects a change in the amount of light, the motion sensor is triggered. In some embodiments, the motion detector uses radar or ultrasonic sound waves to detect movement. The motion detector emits radio energy or ultrasonic sound and waits for the reflected energy or sound to bounce back to the source as detected by an adjacent detector. When a person or object moves into or within the field of the emitted radio energy, there is a change in the amount of reflected energy and or the time it takes for the reflected energy to arrive back to a sensor. This change is detected and triggers the motion sensor to signal that motion is detected. In some embodiments, the motion detector detects infrared energy. Humans radiate infrared energy at between 9 and 10 micrometer wavelength. The motion detector can detect such infrared energy or changes of infrared energy within its detection area and trigger the motion sensor to signal that motion is detected. In some embodiments, the motion sensor is located within a video camera, such as a security video camera.

The wall dimmer port 162a may be connected to a wall dimmer 162d for allowing a user to manually adjust the light intensity of connected lights. In some embodiments, the wall dimmer is a LED wall dimmer switch sold by Lightkiwi, LLC of Bakersfield, Calif. under the commercial model number A2521. In some embodiments, the wall dimmer comprises silicon-controlled rectifiers or variable resistors to vary the power provided at a connected light.

The exit sense port 162b may be connected to a light sensor 162e. In some embodiments, the exit light sensor 162e is a sensor sold under the brand name Precision Multicontrol and having a commercial model number of LCA-624A.

In some embodiments, the gateway has all the functions and features of an end unit in addition to the functions of the gateway. Therefore the gateway light sensor port 141, motion sensor port 142, wall dimmer port 143, and exit sense port 145, may be connected to corresponding light sensor 141a, motion sensor 142a, wall dimmer 143a, and exit light sensor 145a, respectively. The sensors 141a, 142a, 145a are of the same type of sensor as 169a, 162c, 162e, respectively. Likewise, the wall dimmer 143a may be the same type of dimmer as dimmer 162d. Therefore the use of the term control device herein comprises end units and gateways.

In some embodiments, the end unit is configured to dim and control multiple LED panels independently. In such embodiments, involved in serial dimming, the end unit will have a second power-in port 164a and a corresponding second power-out port 168a as shown in FIG. 3. In some embodiments, the end unit will have the ability to control between 1 and 10 or more LED panels and thereby may have corresponding power-in and power-out ports for controlling each LED panel.

In some embodiments, the end unit is configured to dim and control multiple LED panels via dimming control signals. For example, the end unit may have a second dimming control signal port 166a. In some embodiments, the end unit will have the ability to control between 1 and 10 or more LED panels and thereby may have corresponding dimming control signal ports for each.

In some embodiments, the end unit may be configured to support serial dimming and control signal dimming configurations in the same unit. In some embodiments, the end unit only has serial dimming features or only control signal dimming features.

It will be recognized that the ports 162, 164, 164a, 166, 168, 168a, 169, and the adapter 160 are shown diagrammatically in FIGS. 3 and 4. The ports 162, 164, 164a, 166, 168, 168a, 169, may be configured to receive a wired connection, such as a CAT 5 Ethernet cable connection. In some embodiments, the ports 162, 164, 164a, 166, 168, 168a, 169, are wires extending from a circuit board within the gateway capable of being connected to corresponding external components. In some embodiments, the ports 162, 164, 164a, 166, 168, 168a, 169 are either wires or receiving ports. It will further be recognized that the wireless network adapter 160 may be contained within the gateway housing and connected to an antenna that is located within the housing and/or extending outside of the housing.

FIG. 3 shows the end unit in an in-series configuration. A first power supply 159 is connected to a power source, such as a wall outlet, via a first power-in line 163. The output power is supplied on the power line 161 to the first power-in port 164 of the end unit 112. The power supply may be any known in the art and suitable for a given application, such as LED lighting applications. In one embodiment, the power supply is a 40 W Single Output Switching Power Supply sold by Mean Well Corporation of Taiwan having a part number of HLG-40H-24A, with an output of 24 Volts DC, 1.67 Amps, 40.08 Watts, and 22-27 Volts. In one embodiment, the power supply is a 40 W Single Output Switching Power Supply sold by Mean Well Corporation of Taiwan having a part number of HLG-40H-24B, with an output of 24 Volts DC, 1.67 Amps, 40.08 Watts, and 22-27 Volts.

The output power line 165 is connected to the first output power port 168. The output power line 165 is connected to a light source, such as an LED panel 156. In some embodiments, the LED panel comprises a plurality of LEDs 158 fixed to a circuit board and electronically connected to a power circuit supplied by the output power line 165. In some embodiments, a heat sink (not shown) is attached to the back surface of the LED panel to dissipate heat generated by the LEDs. The heat sink may be any such known in the art, including an aluminum heat sink with a plurality of heat dissipating fins extending from a main surface of the heat sink. The fins are spaced apart to provide intervening gaps between the fins.

In some embodiments, a second power supply 159a is connected to the second power-in port 164a. The controlled output related to the power from the second power supply 159a is sent at the second power-out port 168a. The end unit has a function to control the power level sent to LED panel 156 independently from the power level sent to LED panel 165a.

In some embodiments, a second power supply is not necessary, instead a power supply with two channels may be utilized. In such case the first channel of power from the power supply can be directed to the first power-in port 164 and the second channel of power from the power supply can be directed to the second power-in port 164a, so that one power supply can be used to power more than one LED panel. In some embodiments, the end unit may be configured to split power delivered to one power-in port and provide output power on two or more power-out ports from the one power-in line.

FIG. 4 shows the end unit in a control signal dimming configuration. In this configuration, the power supply 159 is connected directly to the LED panel 156. The first control port 166 of the end unit 112 is connected to a first power control port 167 on the power supply 159. In this arrangement, the power supply regulates the power sent to the LED panel 156 based on the control signal provided by the end unit 112 to the power control port 167. The control signal provided by the end unit to the power control port(s) may be any signal, such as Pulse Width Modulation (PWM), voltage, or resistance (ohms).

In some embodiments, a second power supply 159a is connected to a second power control port 167a on the end unit. In this arrangement, the power supply regulates the power sent to the second LED panel 156a, having a plurality of LEDs 156b, based on the control signal provided by the end unit 112 to the second power control port 167a of the second power supply 159a. In some embodiments, multiple power supplies can be control by a signal sent from a single power control port, to which multiple power supply control lines are connected.

FIGS. 3 and 4 show continuation ellipses 156c, 159b that indicate more than two LED panels and corresponding power supplies, respectively, can be controlled by a single end unit. In such case the end unit will have a corresponding power-in and power-out ports or control ports to control the corresponding additional LED panels and/or power supplies. Similarly, a gateway can be configured to control more than two LED panels and/or power supplies.

While the term end device is used, the end device in series does not necessarily need to be the last device before the lighting. For example, FIG. 4 shows that the power supply is the last device before the lighting and that the end device controls the power supply. Further, other devices may be in-line between the end device and the lighting.

Device Registration

The dimming is controlled by a control application 101. In some embodiments, the control application 101 operates on the application server 102. Screen views from one embodiment of the control application 101 are shown in FIGS. 5-26 and 28-30.

Figure 5:
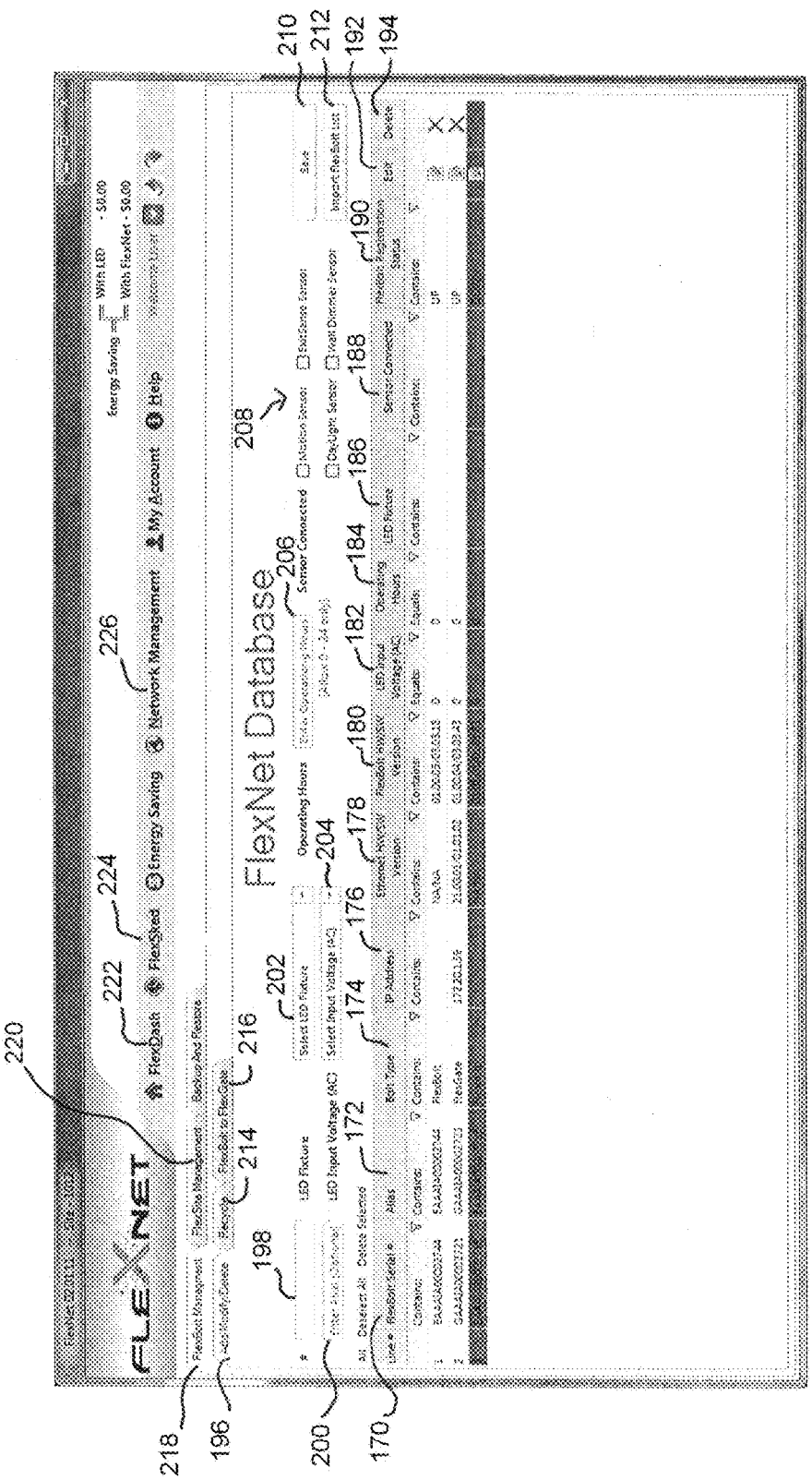
FIG. 5 is a screen view of a system management window of the lighting control system of FIG. 1.

The control application comprises one or more databases 103. A screen view of a database screen of the control application is shown in FIG. 5. In one embodiment, the database 103 comprises the following sections corresponding to the columns shown in FIG. 5: a device serial number section 170, an alias section 172, a device type section 174, an IP address section 176 (if applicable), a Ethernet hardware/software version section 178, device hardware/software versions section 180, LED input voltage section 182, operating hours section 184, LED fixture section 186, sensor connected section 188, and device registration status section 190.

The device serial number section 170 contains a serial number of the end unit or the gateway. The alias section 172 contains an alternative name for the corresponding control device. The device type section 174 contains a value indicating the type of control device, such as an end unit, or a gateway. In FIG. 5 the term Flexgate indicates a gateway and the term Flexbolt indicates an end unit. The most recent IP address of the corresponding control device is shown in the IP address section 76. The Ethernet a hardware/software version section 178 contains the version number corresponding the Ethernet a hardware/software version for the corresponding device. The device hardware/software versions section 180 contains hardware firmware and software version information of the control device. The LED input voltage (AC) section 182 contains applicable voltage at the site where LED fixture is installed. The operating hours section 184 contains an optional predefined hours of operation designated with respect to the corresponding control device by default. The LEDs fixtures section 186 contains the fixture model names of the manufacturer providing the lighting connected to the corresponding control device. The sensor connected section 188 contains information about whether a motion sensor, an exit sense sensor, a light sensor, a wall dimmer sensor, or other sensor is connected to the corresponding control device as entered by the user. The device registration status section 190 contains an indication whether the control device is registered in the database. In order for the control application to control a control device, such as a gateway or an end unit, the control device must be registered with the control application.

Figure 5A:
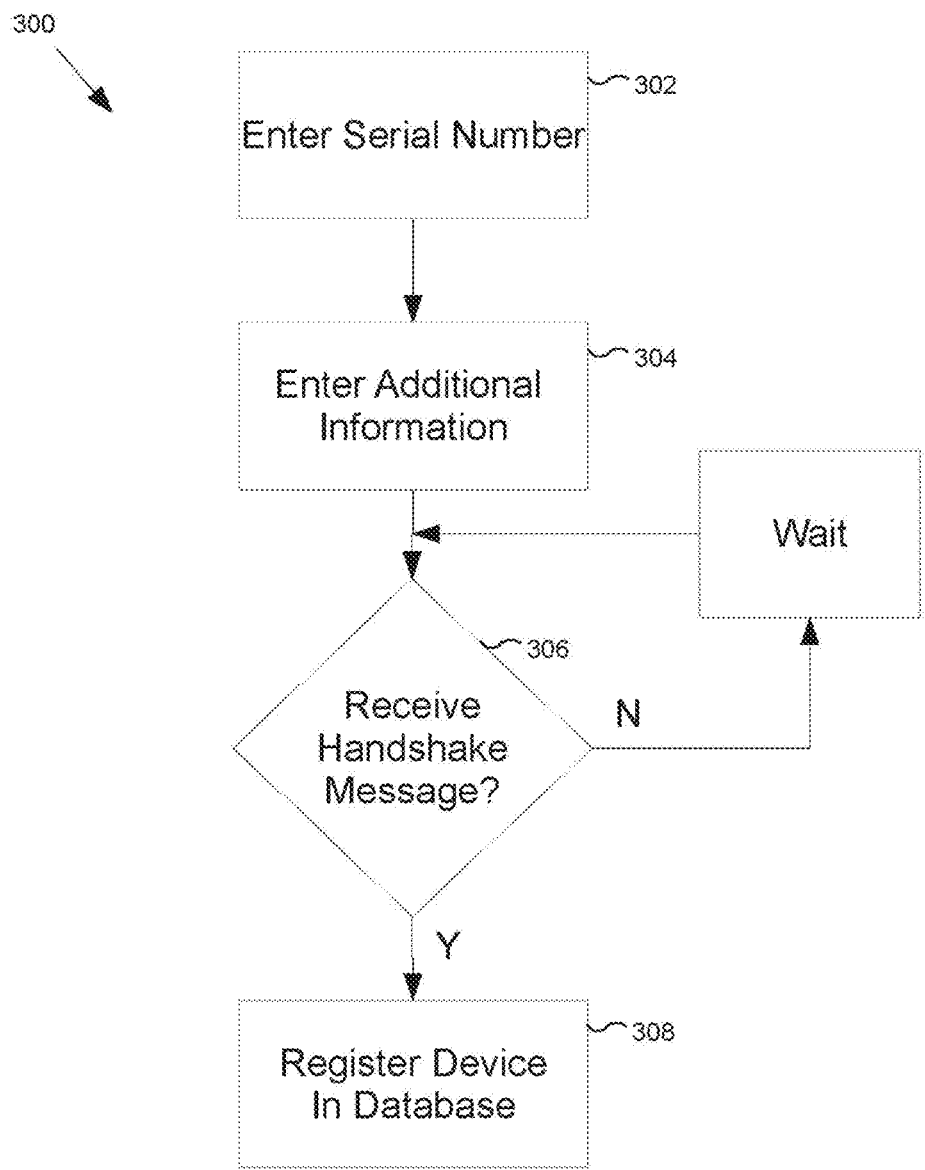
FIG. 5A is a flow diagram of a control application device registration function of the lighting control system.

One embodiment of a control application device registration function 300 is shown in FIG. 5A. At steps 302 and 304 the control device is entered into the database by a user. At step 302, the user enters the control device serial number or ID number in the device serial number field 198. At step 304 the user enters additional information about the control device in fields 200 through 208. In field 200 the user enters an optional alias such as a nickname for the control device. The alias entered in the field 200, will appear in the alias section 172 of the database. In the LED fixture field 202 the user will select an available fixture model number from a drop-down list. In the LED input voltage field 204 the user will select the applicable voltage at the site where LED fixture is installed. In the hours of operation field 206, the user will define the hours light was historically used to so energy efficiency gains by using the system can be calculated. In section 208, the user will indicate whether the control device has the following connected to it or integrated in it: a motion sensor, a exit sense sensor, a light sensor, a wall dimmer sensor, or other sensor. the user will then click the save button 210 to submit the information provided in fields 198 through 208 into corresponding sections of the database. At step 306, the control application will wait for a communication from the control device corresponding to the serial number entered. If the application receives a communication from a control device corresponding to the serial number entered, the control application will, at step 308, change the device registration status flag to indicate that the control device is registered in the device registration status section 190 corresponding to that control device.

For example in FIG. 5, the devices in rows one and two are register as shown by the registration status section 190. This means that the control application has received a communication from those corresponding devices. However, the device of row three is not registered because the control application has not received a communication from the device. Once a device is registered, the control application is able to control it.

End Unit Registration

Figure 5B:
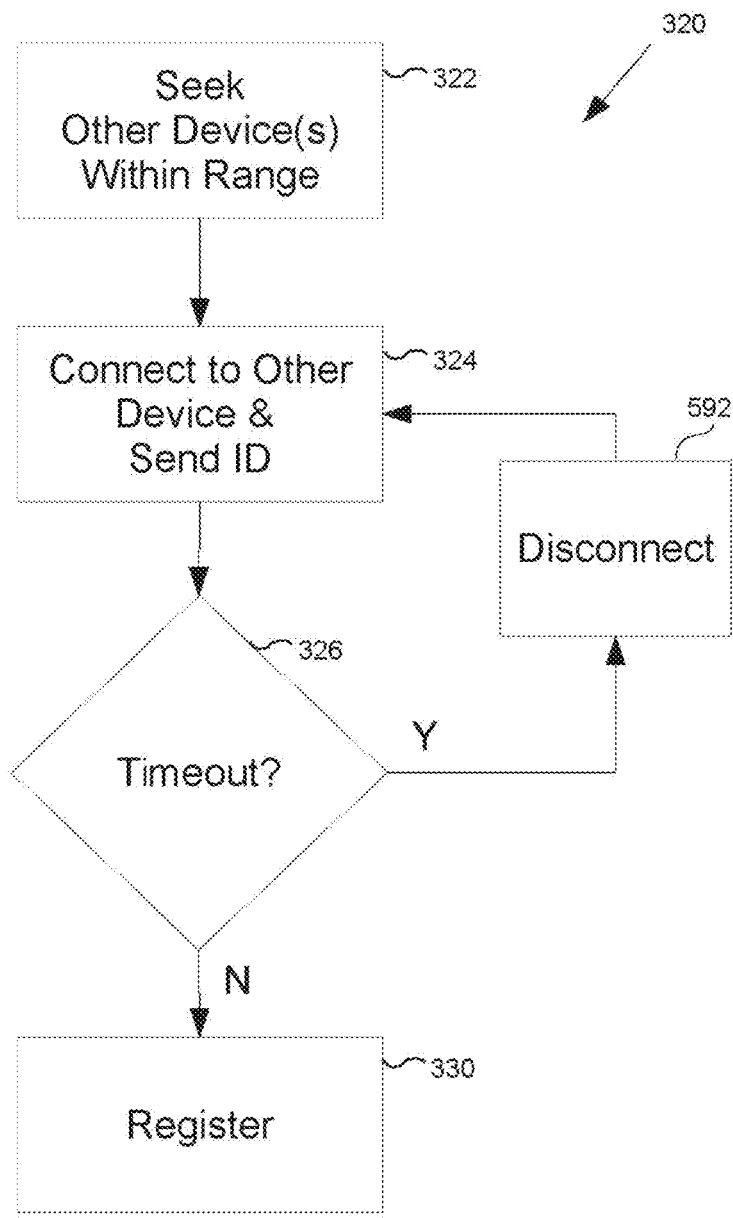
FIG. 5B is a flow diagram of an end unit registration function of a control device of the lighting control system.

Each end unit has an end unit registration function 320 as shown in FIG. 5B. When the end unit is powered on and it has not previously been registered with the control application, at step 322 the searching end unit will begin to search for devices within the range of its wireless transceiver/adapter. When the searching end unit finds another device, e.g. a first device, within range the searching end unit will connect to that device at step 324 and send the searching end unit s unique ID signal, which that contains the searching end unit's serial number and acts as a handshaking signal. Then the searching end unit will proceeds to wait, at step 326, for a response from control application via the first device. At step 326, the searching end unit will start a time-out timer which will wait a predefined amount of time, such as 15 seconds. Then if the searching end unit does not receive a predefined response from the control application via that first device within the predefined amount of time then the searching end unit will proceed to step 328 and disconnect from the first device which it previously connected. In order to ensure that the searching end unit does not repeatedly reconnect to the same first device over and over, the searching end unit will record that first device's ID in a connection table on a memory in the searching end unit. Then the searching end unit will seek out a new device, e.g. a second device, to connect with. The searching end unit will compare the device ID of the second device with the device ID(s) in the connection table to ensure that the second device is not the first device.

If the second device is not the first device, then at step 324 the searching end unit will connect to the second device and send the searching end unit's ID (that contains the device serial number), which acts as a handshaking signal. Then the searching end unit will wait at step 326. If the searching end unit does not received a predefined response from the control application via that second device within the predefined amount of time, then the searching end unit will proceed to step 328 and disconnect from the second device. The searching end unit will then seek out a new device, e.g. a third device, to connect. It will compare the device ID of the third device with all of device IDs in the connection table to ensure that the third device is not the first device or the second device. If the third device is not the first or second devices then the end unit proceeds to repeat steps 324, 346, and 328, until the searching end unit receives a predefined handshake/registration message from the control application. When the searching end unit receives a predefined handshake/registration message from the control application the searching end unit will register, at step 330, with the control application and will stop searching for a network/control application. The control application will then indicate in the database that the record corresponding to the device serial number of the end unit is registered in the device registration status section 190.

In the case that the searching end unit has not received a predefined handshake/registration message and there are no new devices within range that the end unit has not already connected with, as shown by searching the connection table, the end unit will then attempt to connect with the first device listed in the connection table. This is because the first device may be a device that is the gateway or another end unit that was not previously connected to the control application but is now connected with the control application. If after disconnection with the first device at step 328, there is a new device, e.g. a fourth device, within range the searching end unit will connect to the fourth device. However, if after the searching end unit disconnects from the first device at step 328, there are no new devices, then the searching end unit will connect the next device listed in the connection table, e.g. the second device. The searching end unit will continue in this manner at each time checking if there is a new device that it has not previously connected with by referencing the device IDs against the connection table. In this way, the searching end unit will connect to new devices when possible, but if no new devices are within range, then the searching end unit will connect to a previously connected device that it connected to least-recently among all the devices to which is has previously connected.

In some embodiments, the searching end unit records the most recent connection time or the connection date and time in the connection table for each device listed in the table. The searching end unit then selects the least-recently connected device by selecting the device in the table that has the oldest time stamp or oldest date and time stamp.

In some embodiments, the searching end unit records the last non-new device that it connected to in a last non-new connection variable. The searching end unit then selects the least-recently connected device by selecting the next device in the connection list following the device recorded in the last non-new connection variable. If there is no existing next electronic device on the list, then the searching end unit selects the first device on the previously connected device list. Devices are recorded in the connection list in order of connection.

In some embodiments, instead of selecting the least recently connected device, the searching end unit chooses another device as long as it is not the same as the immediately previous device to which it connected.

In some embodiments, the next device to connect to is determined by selecting the electronic device that is next on the previously connected device list after the electronic device to which the last connection was made by the searching end unit. If there is no existing next electronic device on the list, then the searching end unit selects the first device on the previously connected device list.

The other device to which the searching end unit might connect include other end units, gateways, and other third party devices. The timeout function at step 326 is designed to account for connecting to third party devices. If the end unit connects to a third party device but does not receive the predefined handshake/registration message, then it will automatically disconnect from that third-party device when the timeout timer expires. This prevents the searching end unit from being permanently connected to third party networks or devices, which would prevent the end unit from ultimately finding and connecting with the networks associated with the control application.

In some embodiments, each end unit has a router function. The end unit router function may be similar to network routers known in the art, such as Internet routers. A router may be a device that forwards data packets between computer networks. When a data packet arrives from one node (device), then using information in the router's routing table or routing policy, the router directs the packet to another node (device). For example, if end unit 118 is not within the range of the gateway 108 and end unit 112 is within range of the gateway and within range of end unit 118, then end unit 112 will act as a router to route data between the end unit 118 and the gateway 108. Then the gateway will route the data from end unit 118, as received via end unit 112, to the application server 102.

The routing from end unit 118 through end unit 112 to the gateway 108, is considered one hop routing. Any number of hops may occur between an end unit and the gateway. In some embodiments, the end unit can be up to 15 hops away from the gateway. In other embodiments, the number of hops is limited only by the network protocol used to create the network between the end units and between the end units and the gateway. In some embodiments, the network 110 uses the ZigBee protocol, based on the Institute of Electrical and Electronics Engineers (IEEE) 802.15 standard. In some embodiments, the network 110 uses the Wifi protocol, based on the IEEE 802.11 standard.

Scheduling and Control

Figure 6:
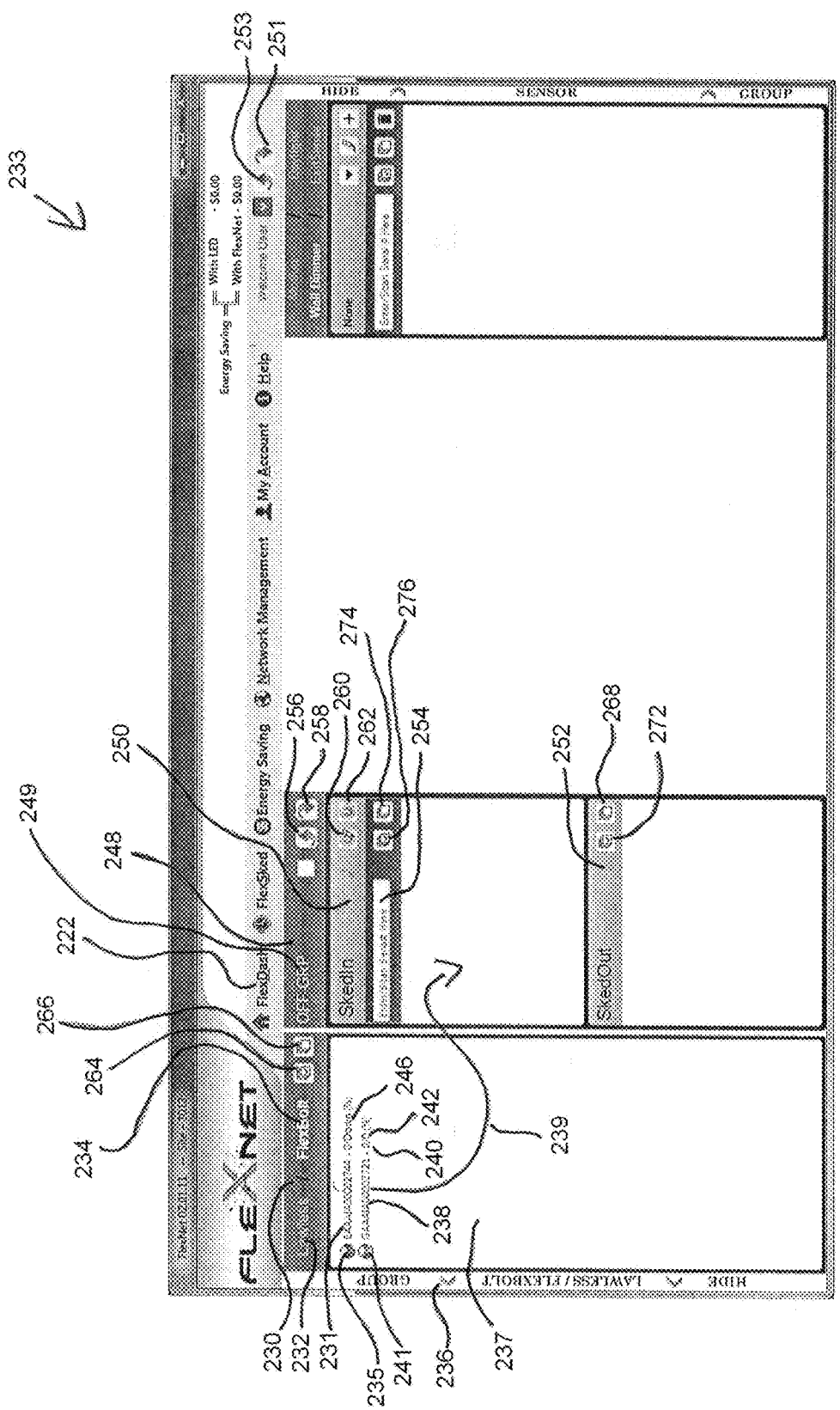
FIG. 6 is a screen view of a scheduling screen of a lighting control application of the lighting control system.
Figure 9:
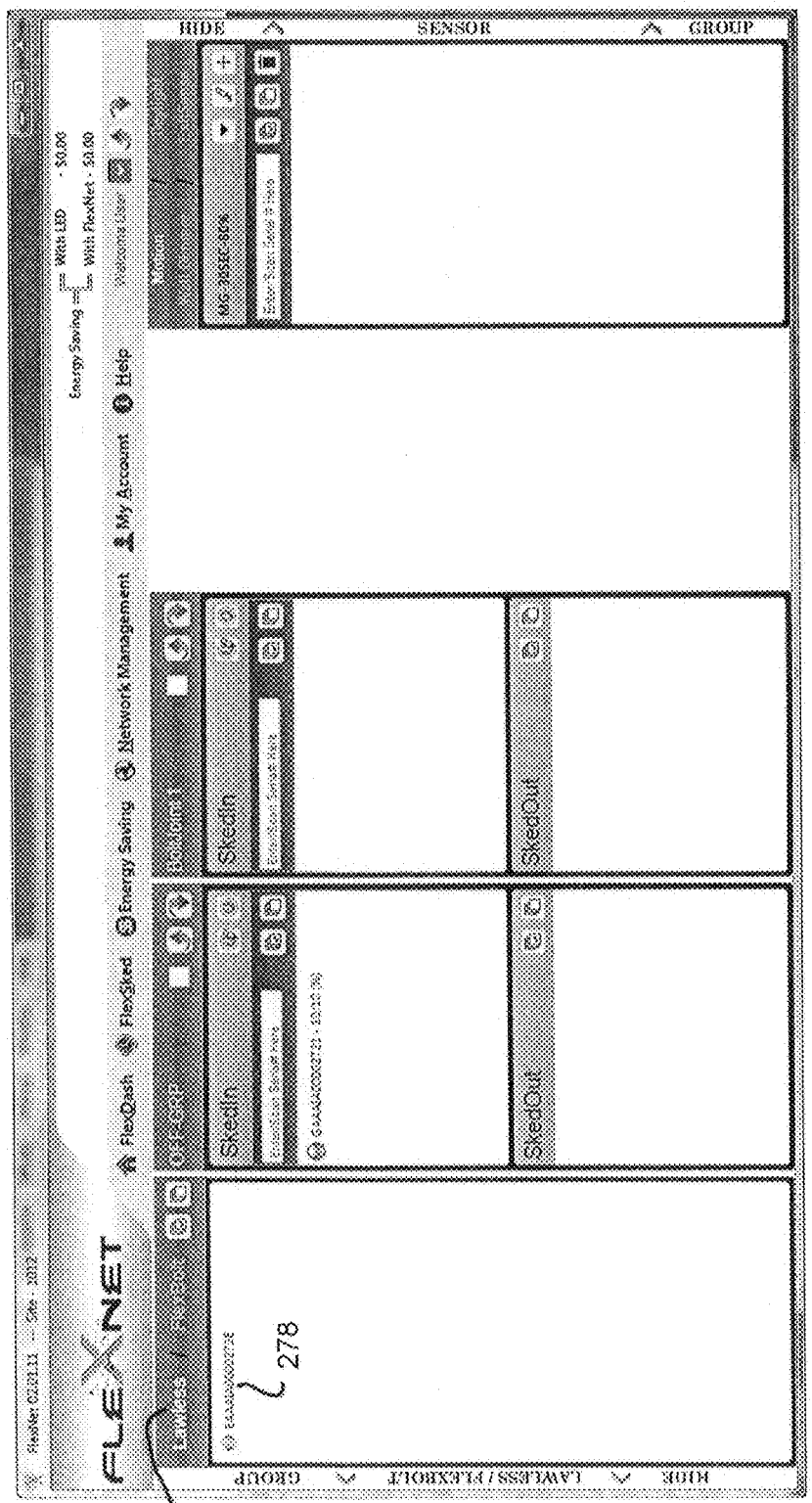
FIG. 9 is a fourth variation of the screen view of the scheduling screen of the lighting control application.
Figure 10:
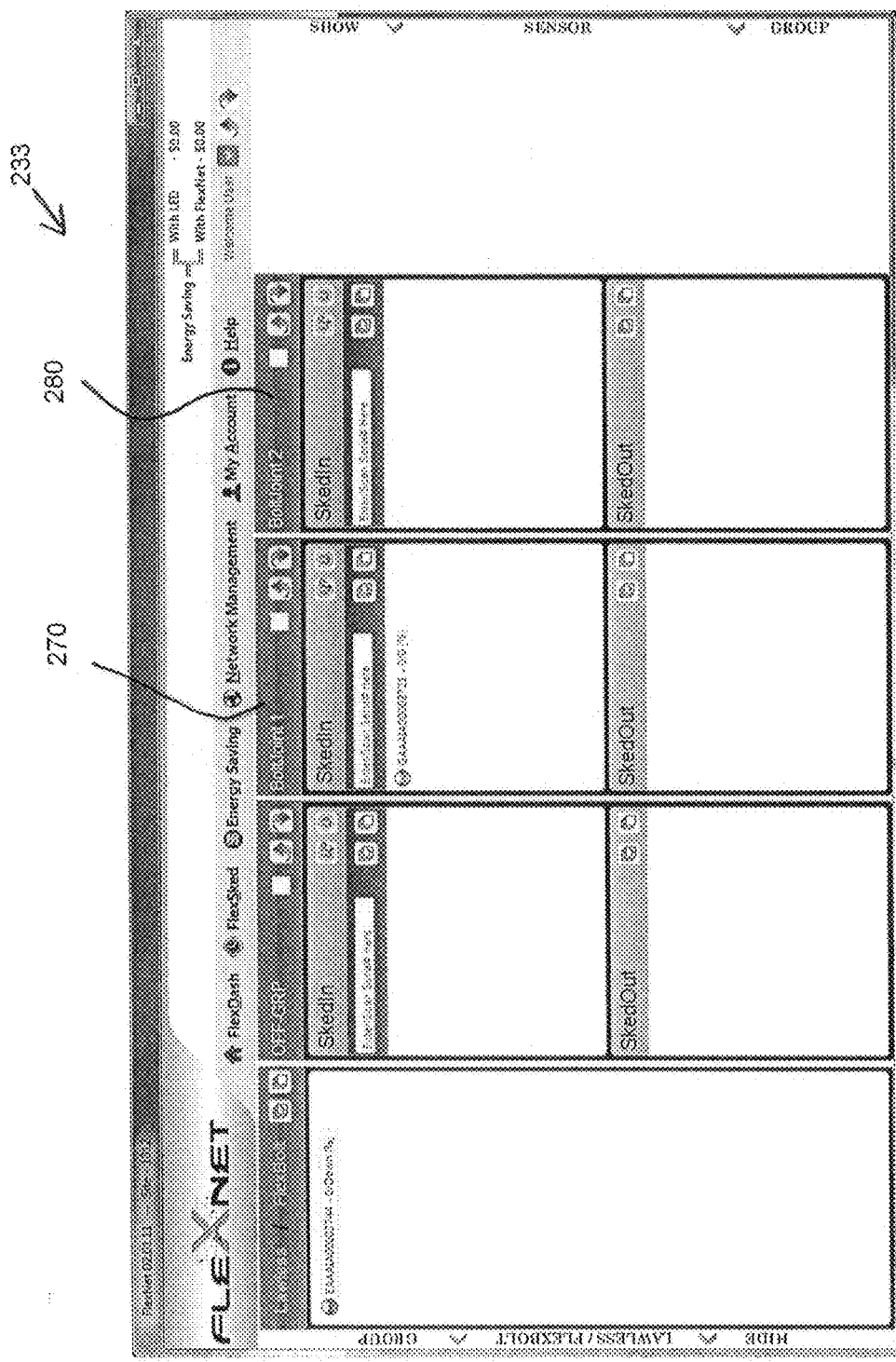
FIG. 10 is a fifth variation of the screen view of the scheduling screen of the lighting control application.

FIG. 6 is a screen view of a scheduling screen 233 of the control application 101. A user may navigate to the scheduling screen by selecting the schedule or FlexDash button 222. The scheduling screen 233 has a device standby window 230 that shows devices that are not in a schedule. The device standby window 230 has two different views depending on whether the FlexBlot button 234 is selected to show registered devices, which is what is shown in FIG. 6, or whether the lawless button 232 is selected to show devices 278 that have been entered into the database but are not registered, as shown in FIG. 9.

In FIG. 6, two devices, as represented by corresponding device graphical user interface objects 231, 238 are shown in the standby window 230. These interface objects 231, 238 correspond to the same devices shown in row 1 and 2 of FIG. 5. The device graphical user interface objects 231, 238 represent corresponding control devices 112, 108. Instructions, schedules, functions, and alerts for each control device 112, 108, can be set using and manipulating the corresponding graphical user interface objects 231, 238 within the graphical user interface of the control application 101, as will be described below.

Next to each of the object 231, 238 has a set value 240 and a reported status value 242. The reported status value 242 corresponds to the power level that the corresponding control device is reporting to be providing to the connected LED panel at the current time or as last reported by the control device. The set value 240 is the power level that the control application has instructed the corresponding device to operate at. As shown in FIG. 6, control device corresponding to object 238 is instructed by the control application to provide 0% power and the control device 238 is reporting that it is providing 0% power. Regarding control device corresponding to object 231, the control application has instructed that control device to provide 0% power and the control device is not reporting to the control application, as indicated in the reported status 246 as being "down". This indicates that the control device is not powered up or is not within communication with the network to which the control application is connected through the gateway.

Figure 7:
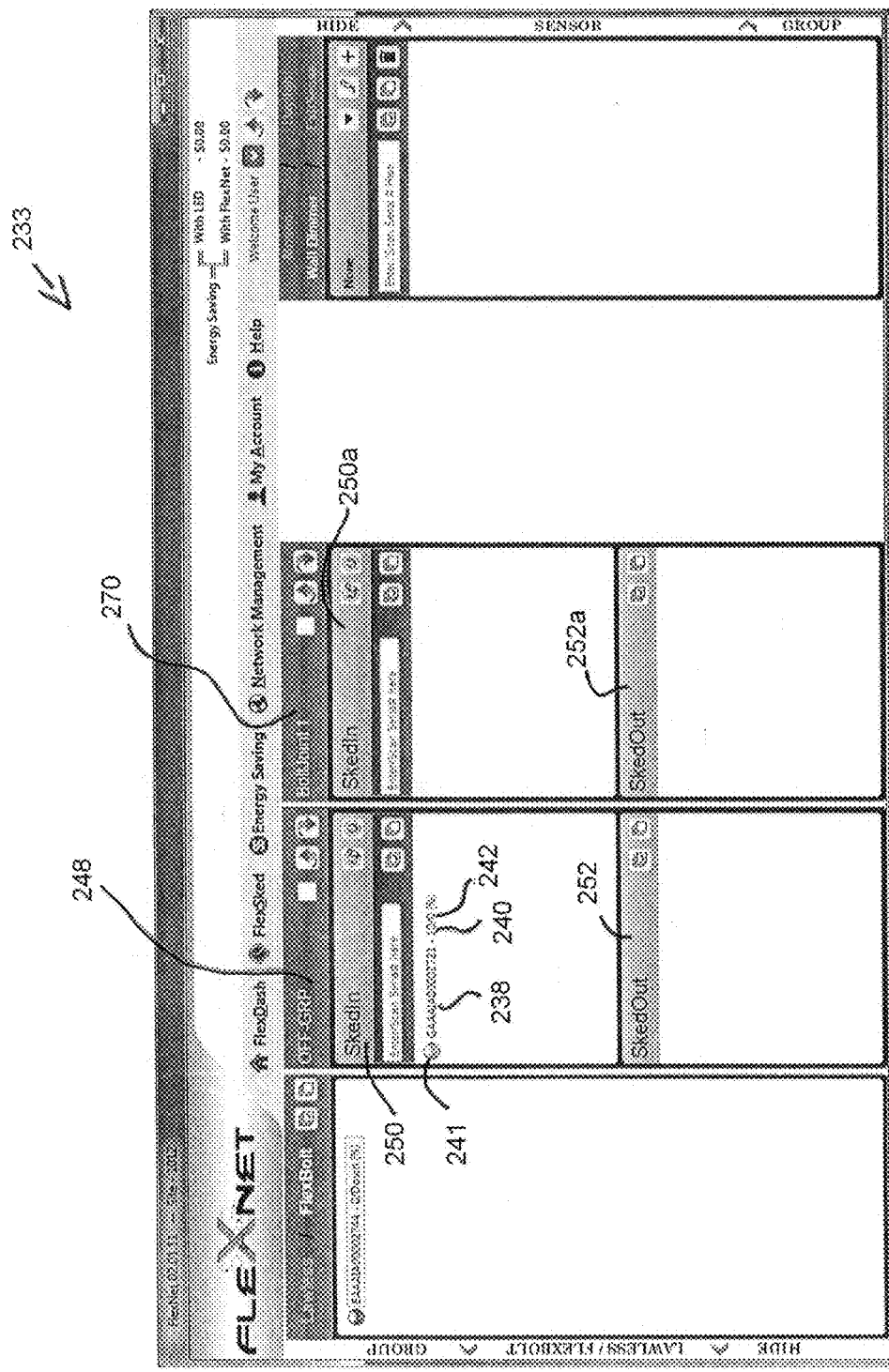
FIG. 7 is a second variation of the screen view of the scheduling screen of the lighting control application.
Figure 8:
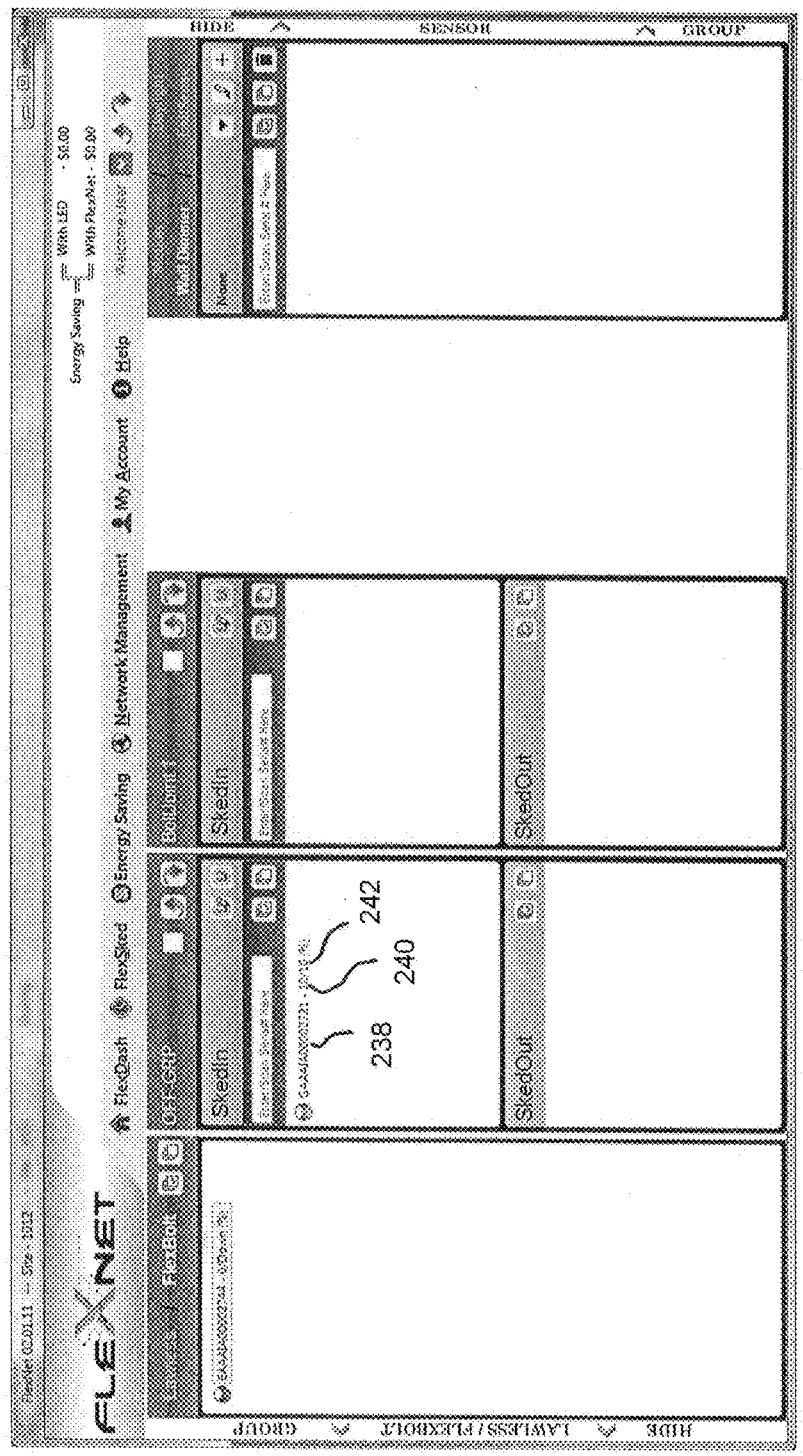
FIG. 8 is a third variation of the screen view of the scheduling screen of the lighting control application.

Status indicators 235, 241 are adjacent each of the object 231, 238 listed in the standby window 230. The status indicator 235 may be red to indicate the corresponding control device is down and not in communication with the control application. Status indicator 241 may be green to indicate the corresponding control device is connected and ready. The status indicator may also be another color such as yellow to indicate that the control application has instructed the corresponding control device to provide a power at a set level but the control device is not yet reporting power at that level, such as shown in FIG. 7. FIG. 8 shows that control device corresponding to object 238 is reporting a 10% power output at the reported status value 242 which matches the set value 240 of 10% as instructed by schedule.

Adjacent to the standby window 230, is one or more schedule windows 248, 270, 280. Each of the schedule windows 248, 270, 280 corresponds to a particular dimming schedule. While three schedule windows 248, 270, 280 are shown in the various figures, it will be appreciated that any number of windows can be provided corresponding to any number of schedules, to the extent that the application server system memory or database has space for such schedules.

Each schedule window contains a skedin (or in-schedule) window 250 and a skedout (or out-of-schedule) window 252. The in-schedule window 250 will list each device that is currently on the corresponding schedule. The out-of-schedule window 252 shows device graphical user interface objects corresponding to control devices that are not currently operating on the corresponding schedule but are associated with the in-schedule window.

Drag-and-Drop

As shown by the arrow 239 in FIG. 6, the control application has a drag and drop feature that allows the user to click on and drag interface object, such as interface object 238, into a schedule window and drop it there, such as into schedule window 248, as shown in FIGS. 6 and 7. The drag-and-drop procedure involves a user using a pointing device, such as a mouse, to place the cursor or pointer over the interface object 238 and then to click and hold a button of the mouse or pointing device, and while holding the button, to move or drag the cursor to be in the in-schedule window 250 of the schedule window 248. Once user moves the cursor into the out-of-schedule window 252 the user then can release the mouse button to drop the interface object 238 into the out-of-schedule window 252, where the corresponding control device will then operate according to the out-of-schedule schedule.

The control application will generate a graphic display which shows the interface object 238 moving along with the cursor towards the out-of-schedule window 252 while the user has the mouse button held down and is moving the pointing device correspondingly. Therefore, the dragging will track the user's movement of the pointing device while a mouse button or other indicator his held down. Other pointing devices such as touchpads may also be used. In addition, in an instance where the control application is in communication with a touch screen the drag-and-drop feature can be carried out by a user touching and holding the touch on the interface object 238 with their finger and dragging it across the screen with their finger to be in-schedule window 250 and dropping it when their finger is released from the touchscreen in the in-schedule window 250. Other forms of drag-and-drop operations in a graphical user interface objects may also be used.

Each of the windows 230, 250, 252 have a select all button 264, 274, 272 and a deselect all button 266, 274, 268. The select all button selects all of the interface objects within the corresponding window, so that those interface objects can be dragged all at once to another window, such as window 248. The select all button allows the user to easily drag-and-drop groups of interface objects from the corresponding window, by clicking and dragging any one of the group of selected interface objects. The deselect all button unselects all of the devices within the corresponding window.

Schedules

Figure 11:
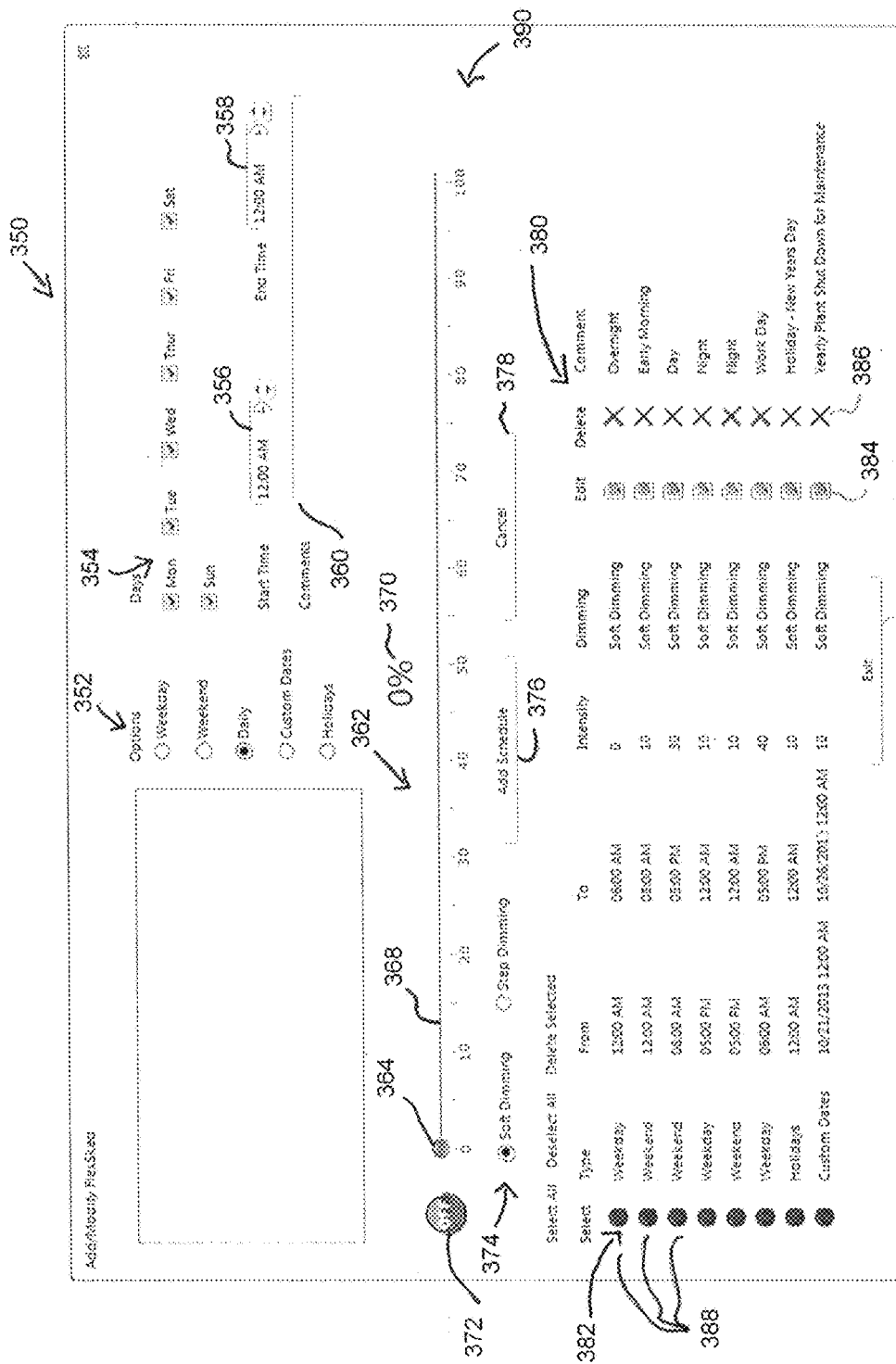
FIG. 11 is a schedule edit window of the lighting control application.

Each of the in-schedule windows 250 has a schedule edit button 260 and a schedule view button 262. When a user clicks on the schedule edit button 260, a schedule edit window 350 appears as shown in FIG. 11, corresponding to the in-schedule window. The schedule edit window 350 is used to set, add to, or modify the schedule of the corresponding in-schedule window. On the schedule edit window 350 the user can view, change, or create new sub-schedules 388. Sub-schedules 388 are shown in the sub-schedule table section 380 of the schedule edit window 350. A sub-schedule can be edited by clicking on the corresponding edit icon 384. When the edit icon 384 is selected for a corresponding sub-schedule, then the details of the sub-schedule are populated into an upper change portion 390 of the schedule edit window 350 and the text of the add scheduled button 376 will read "update schedule." If it is instead desired to create a new sub-schedule the user may begin defining the various parameters in the upper change portion 390, and when complete, may click the add schedule button 376, to add the sub-schedule to the sub-schedule table section 380.

For each sub-schedule, the user must select a type of schedule from the options section 352. The options section provides five options corresponding to radio buttons which the user can select. If the daily option is selected then the days Monday through Sunday will be shown in the days section 354. If the radio button corresponding to the weekend option in the options section 352 is selected then the days Saturday and Sunday will be shown in the days section 354. If the weekday option is selected in the options section 352, then in the days section Monday through Friday will be shown. The user can select or deselect the checkbox adjacent to a corresponding day to indicate whether the sub-schedule applies for that day.

Figure 12:
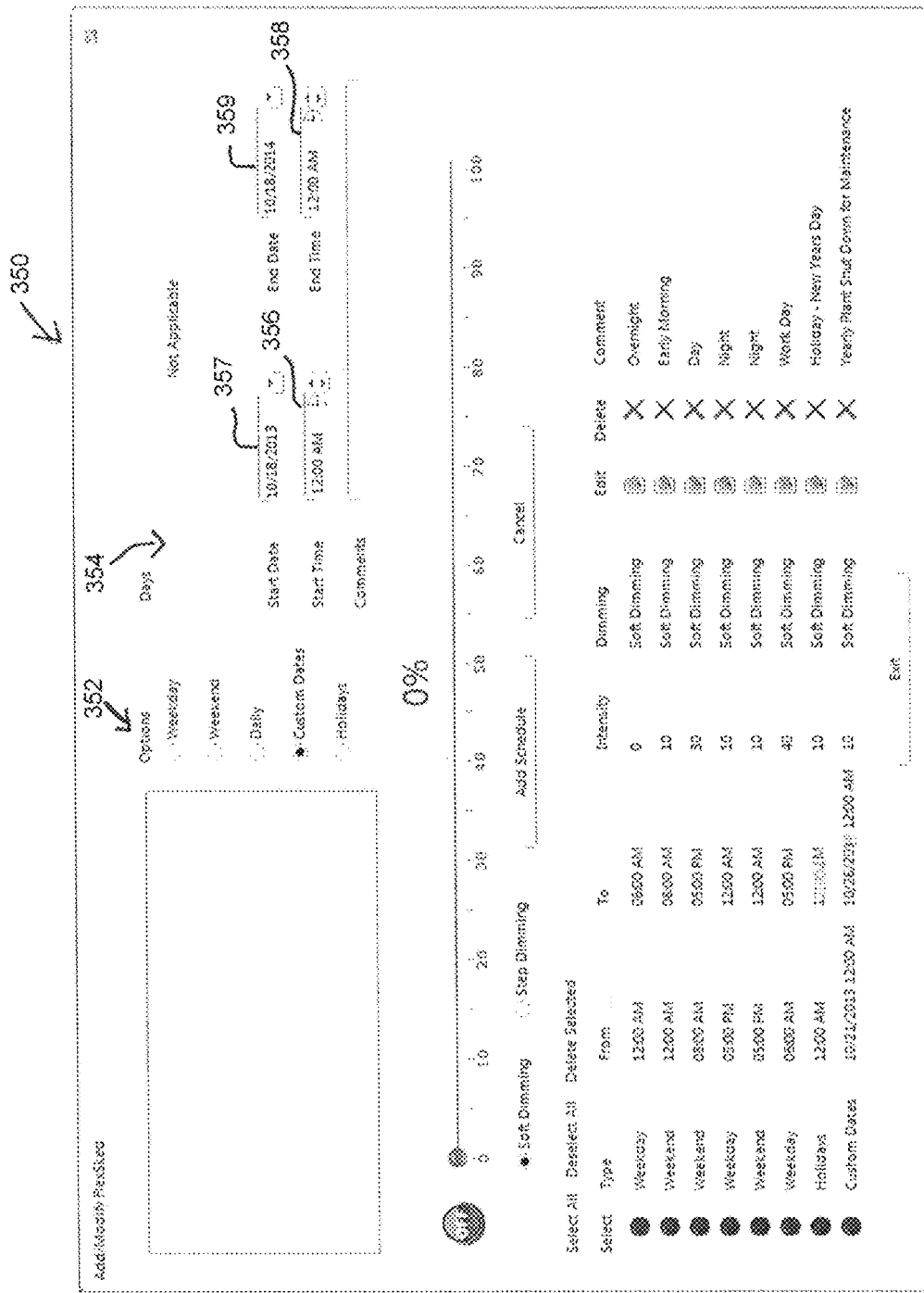
FIG. 12 is a second variation of the schedule edit window of the lighting control.
Figure 13:
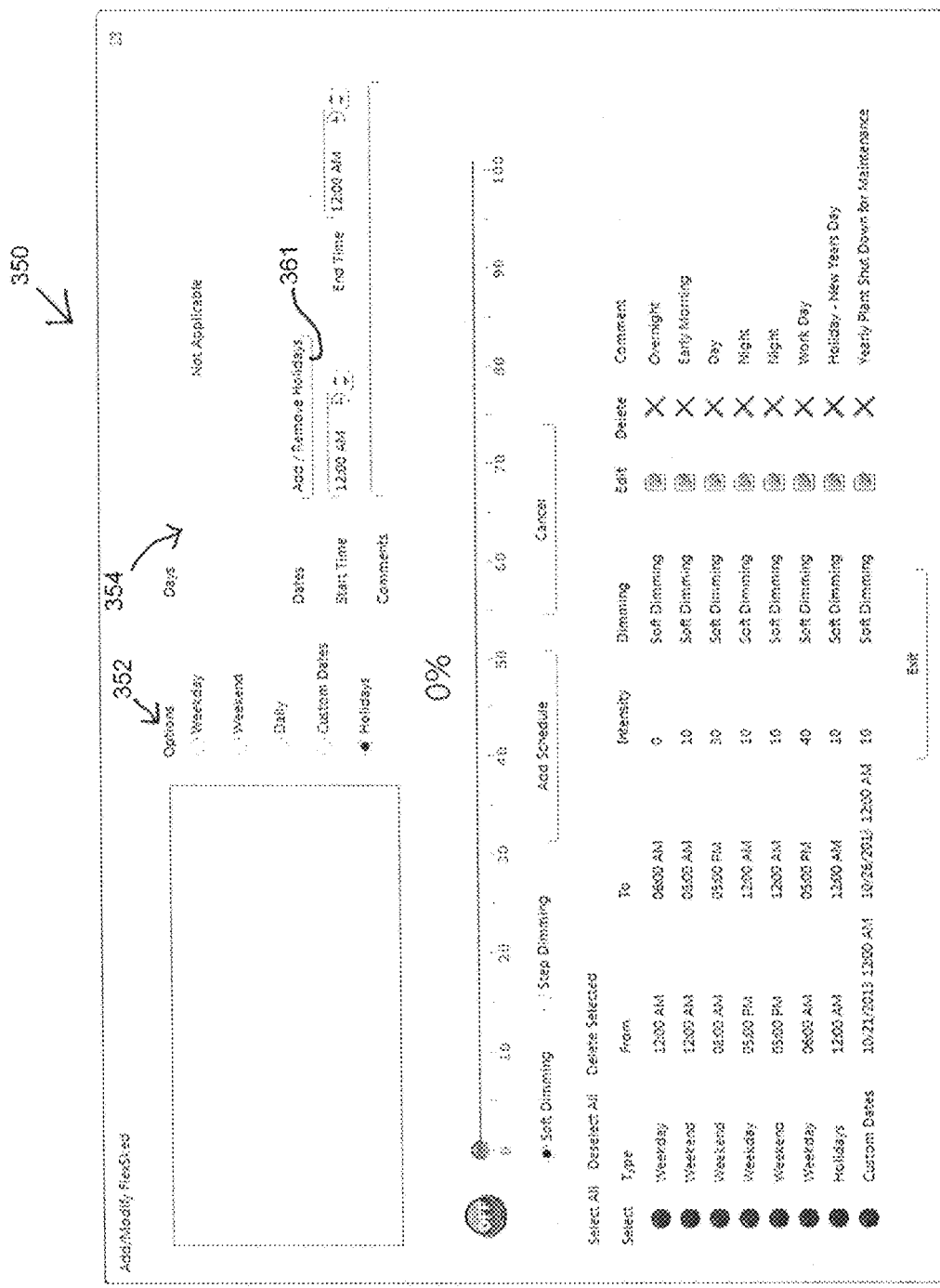
FIG. 13 is a third variation of the schedule edit window of the lighting control application.
Figure 14:
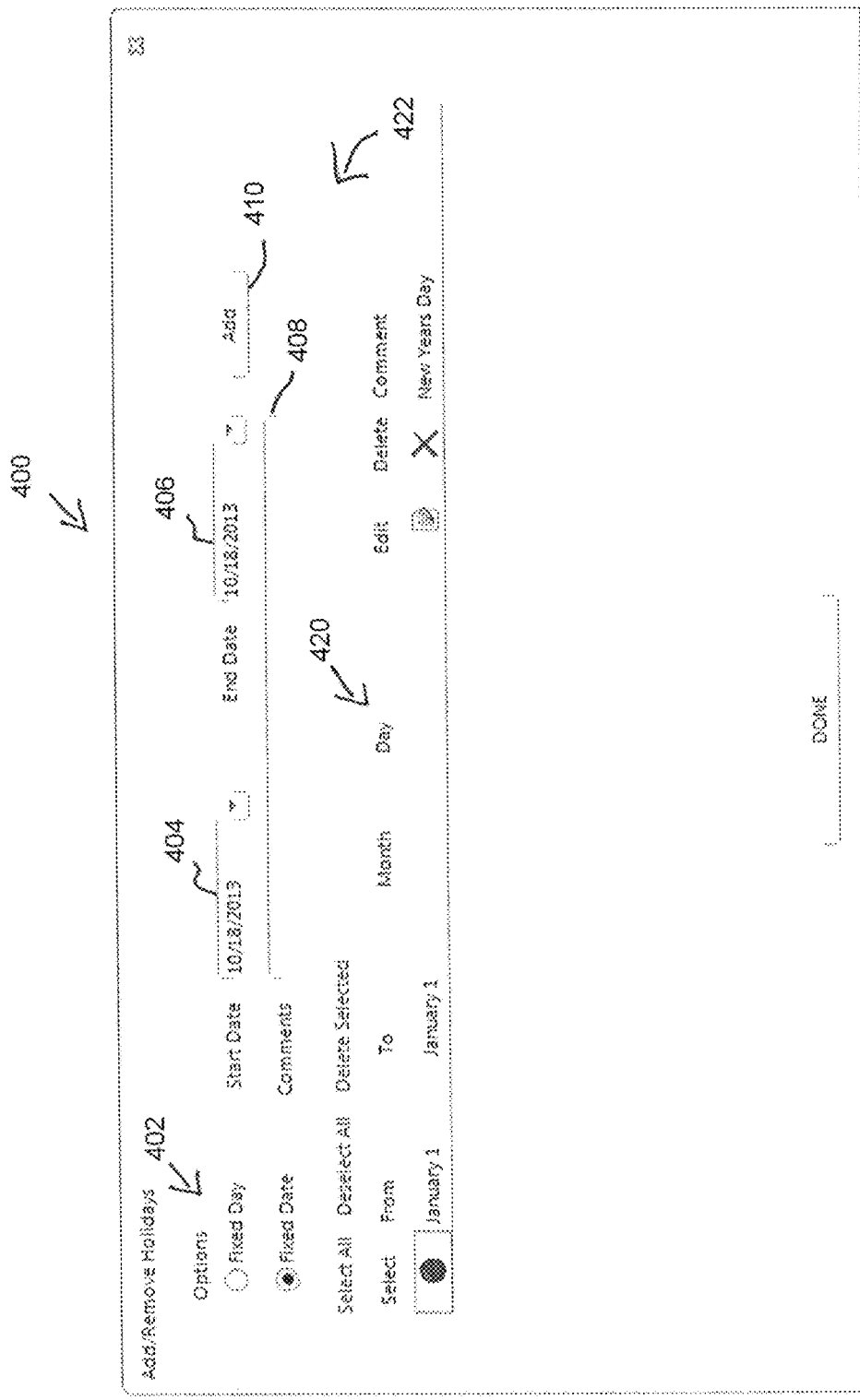
FIG. 14 is a second variation of the holidays configuration window of the lighting control application.
Figure 15:
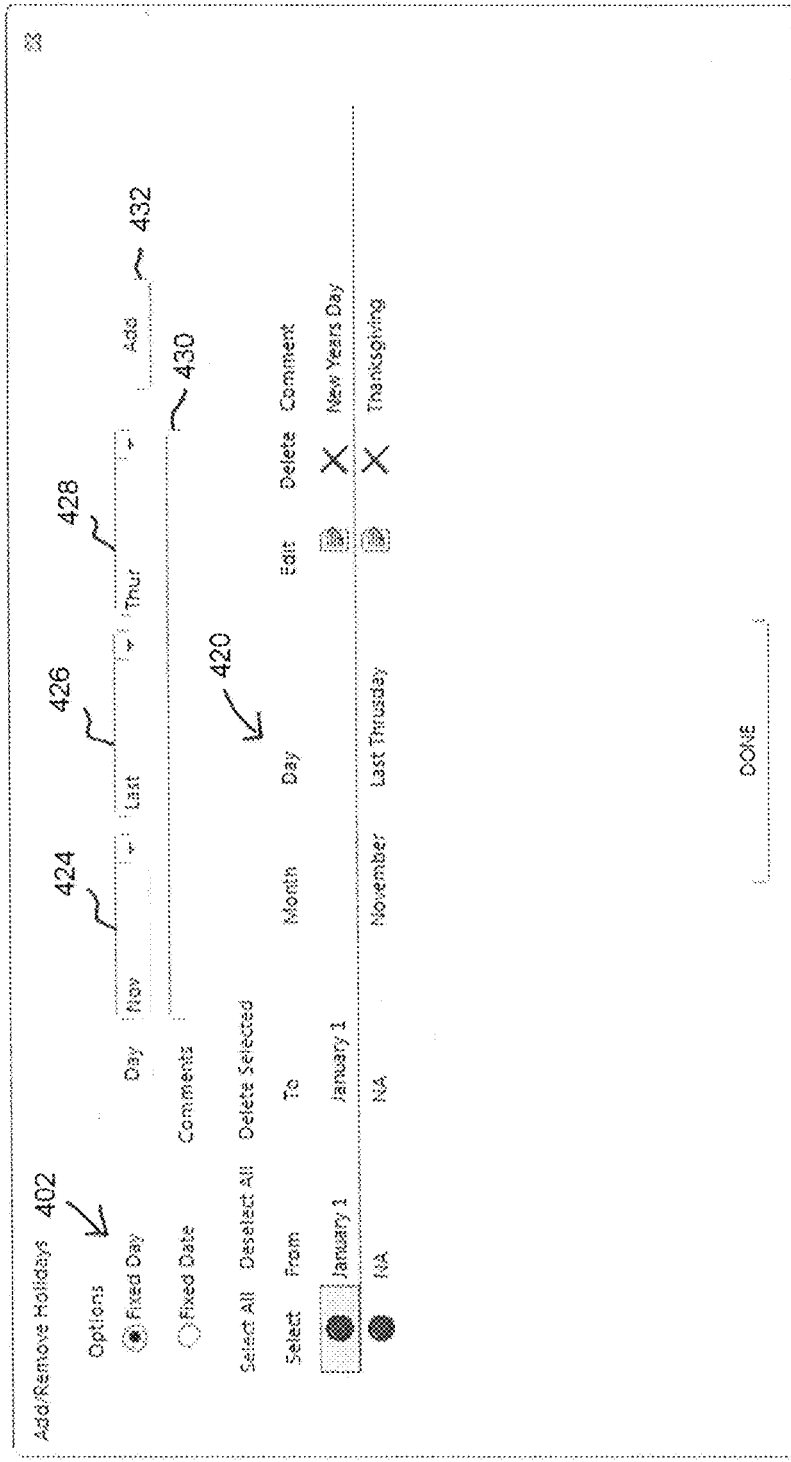
FIG. 15 is a holidays configuration window of the lighting control application.

If custom dates is selected in the options section 352 then no days will be shown in the days section 354, as shown in FIG. 12. Instead a start date field 357 and an end date field 359 will be shown below the days section 354. If the holidays button is selected in the options section 352, no days will be shown in the days section 354. Instead an add/remove holidays button 361 will be shown adjacent the word dates, as shown in FIG. 13. Selecting an add/remove holidays button will bring up an add/remove holidays window 400 as shown in FIGS. 14 and 15.

When selecting the daily, weekend, or weekday radio button in the options section 352 the user will select one or more or all of the days in the days section 354 to indicate on which days the sub-schedule will apply. Then the user will enter a start time in the start time box 356 to indicate when the sub-schedule should start on the days selected in the days section 354. The user will then enter the end time in the end time box 358 to indicate the time when the sub-schedule will end on each of the corresponding days selected in the days section 354.

The user will then turn to a power level section 382 and will move the slide button 364 along slide track 368 to indicate the power level that the lights should operate at during the date and time period specified. Below the slide track 368 are a plurality of numbers indicating the power level corresponding to that position along the slide track. For example, as shown in FIG. 11, there are 20 hash marks indicating 5% increments from 0% to 100%. Each of the 10% increments are designated by numerals as shown in FIG. 11. In FIG. 11, the slide button is positioned at 0%. The slide button can be moved anywhere along the slide track 368 to indicate the percentage of power that the light should operate during the designated date and time. While hash marks are provided for every 5%, in some embodiments the slide button moves in increments of 1%. In some embodiments the slide button moves in increments of less than 1%, such as 0.1% or 0.01% increments. There is a numeral power level indicator 370 shown in FIG. 11 that represents the power level corresponding to the location of the slide button 364 along the slide track 368.

There is a dimming method radio buttons section 374 which allows the user to select whether soft dimming or step dimming will be used to bring the lights to the designated intensity when entering a corresponding sub-schedule. For example, according to sub-schedule table 380 of FIG. 11, at 12 a.m. on a weekday soft dimming will be used to transition the lights from the 10% intensity setting which it will have been operating at from 5 p.m. to 12 a.m. to the 0% intensity that it will operate at from 12 a.m. to 6 a.m.

Soft dimming allows the light to slowly and gradually transition in a manner that's less obvious than step dimming. The dimming may occur over a longer period of time with smaller increment changes in the power intensity. In contrast step dimming will step the power down or up in larger increments than the soft dimming over a shorter amount of time. For examples soft dimming may occur in 1% increments over 30 seconds whereas step dimming may occur in 10% or 20% increments over 5 seconds. In some embodiments, the step dimming will change light intensity instantaneously to the target intensity.

To illustrate the step of adding a sub-schedule to the schedule to result in the second sub-schedule on the sub-schedule table 380, first the user will select the weekend radio button in the options section 352. The user will enter or otherwise select 12 a.m. in the start time box 356. The user will enter or otherwise select 8 a.m. in the end time box 358. The user will enter any comments in the comment box 360, such as in this example, "early morning." The comments can be used to describe the particular sub-schedule and can be beneficial when there is more than one administrator or user so that information about the sub-schedule can be retained by the system for later reference by the same user or by another user.

Next the user will slide the slide button 364 along the slide track to the right and will stop at the hash mark indicating 10 or when the numeral power level indicator 370 indicates 10%. The user will select the soft dimming radio button at 374. Then the user will select the add schedule button 376 and after which, the newly added schedule will appear in the table 380. It will be recognized that the order in which the user enters the schedule information before hitting the add schedule button can be in any order.

The schedule resulting from that shown in the sub-schedule table 380 of FIG. 11, is as follows. On weekdays between 12 a.m. and 6 a.m. the light(s) will be set at zero intensity and soft dimming will be used to move from whatever the prior intensity was to the zero intensity. Zero intensity indicates that the light will be off. Row six shows that on week days between 6 a.m. and 5 p.m. the lights will be set to 40% intensity and will utilize soft dimming to transfer between the 0% intensity and the 40% intensity at 6 a.m. Row four shows that at 5 p.m. on weekdays until 12 a.m. on weekdays the lights will be set at a 10% intensity and soft dimming will be used to transition between the 40% intensity to the 10% intensity at 5 p.m. Row two shows that on a weekend from 12 a.m. to 8 a.m. the lights will be set at an intensity of 10% and soft dimming will be used to transition to 10% at 12 a.m. Row three shows that on the weekend between 8 a.m. and 5 p.m. the light intensity will be set to 30% and soft dimming will be used transition to 30% intensity at 8 a.m. Row five shows that on the weekend between 5 p.m. and 12 a.m. the light intensity will be set at 10% and soft dimming will be used to transition to 10% intensity at 5 p.m.

Row eight shows that during the custom dates ranging from Oct. 21, 2013 at 12 a.m. and Oct. 26, 2013 at 12 a.m. the light intensity will be set at 10% and soft dimming will be used to transition to 10% at the beginning of the custom schedule. Row seven shows a holiday schedule extending all day. The custom and holiday schedules will override a weekday or weekend schedule.

The add/remove holidays window 400 is shown in FIGS. 14 and 15. The window 400 has a type options section 402 where the type of holiday is selected. The holiday can be designated by a fixed day of the month or by a fixed date. If fixed date is selected the user will enter the date the holiday begins in the start date box 404 and enter the date the holiday ends in the end date box 406. The user may enter comments in the comment box 408. Then the user can select an add button 410 to add a holiday to the holiday schedule which is shown in the holiday table 420. The holiday table in FIG. 14 shows one example of a fixed date holiday being January 1 as New Year's Day. A user can select the edit icon to edit the holiday to change attributes about the holiday in the upper change section 422. A user can select the X to delete a holiday from the schedule.

FIG. 15 shows the add/remove window when the fixed day option in section 402 is selected. The user can select a month in the month box 424. The user can select the week in the week box 426. The user can select the day of the week in the day box 428. The user can enter a comment in the comment section 430 such as "Thanksgiving" as shown in FIG. 15. The user can click the add button 432 to add the holiday to the holiday schedule table 420. A user can select the edit icon to edit the holiday to change attributes about the holiday in the upper change section 422. A user can select the X to delete a holiday from the schedule.

Returning to FIG. 11, above the table 380 are select all, deselect all and delete selected texts, each selectable by the user. The select all text will select all of the entries in the table 380. The deselect all text will unselect all of the entries in the table 380. The user may click on the radio button 382 corresponding to a sub-schedule to individually select those sub-schedules. Selected sub-schedules can be deleted by selecting the delete selected text. The select all, deselect all and delete selected texts shown in FIGS. 14 and 15 operate similarly. If the user selects the exit button 391 or the X in the upper right hand corner the add/modify schedule, window will close in the user will be returned to the scheduling screen 233.

Referring to FIG. 6, the title 249 of each schedule window 248 can be changed by right clicking on the title 249 and selecting a option to change the title. This allows the user to name each schedule in a manner which is easy to recall the schedules purpose or the location of the lights within the group assigned to that schedule.

In and Out-of-Schedule

Figure 16:
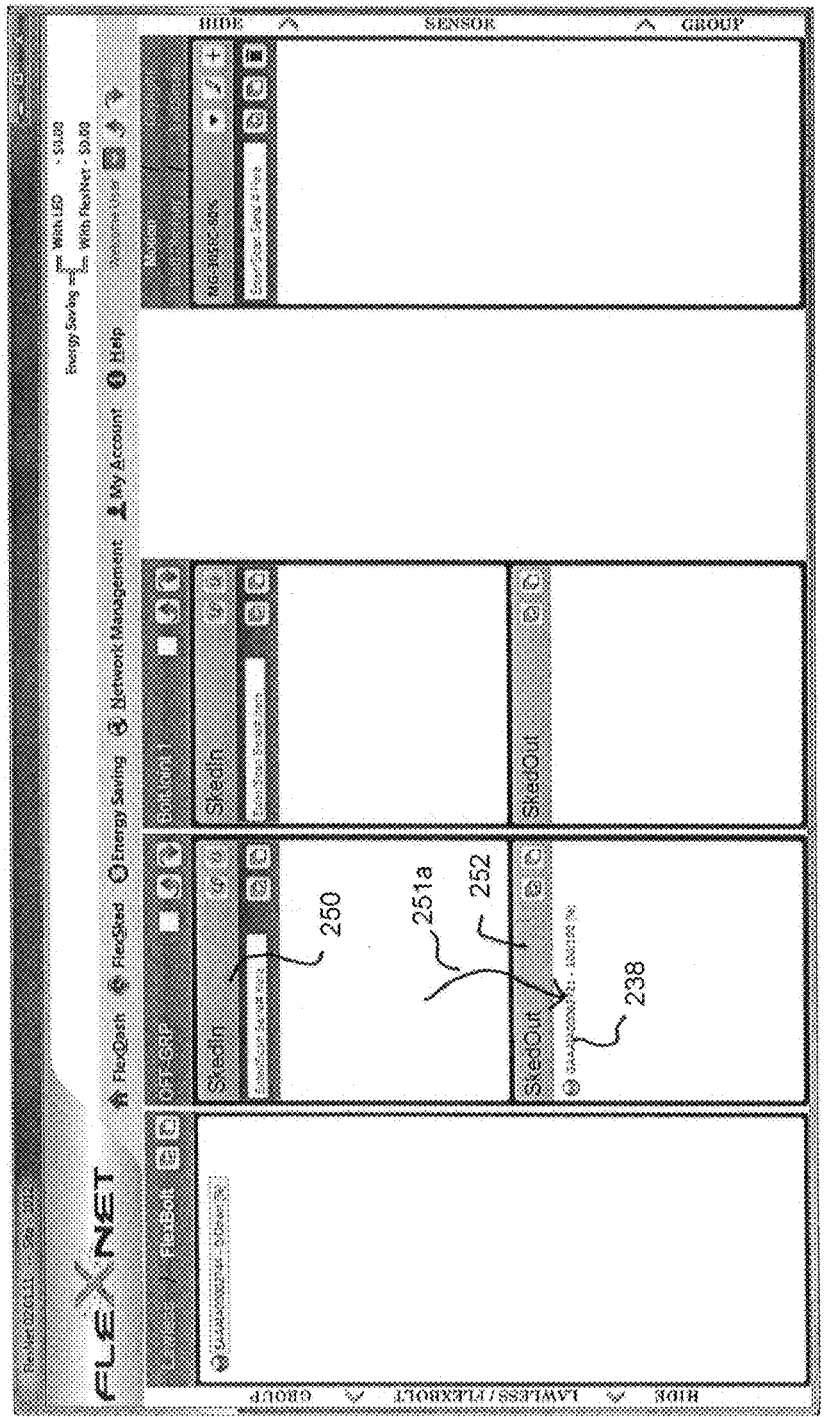
FIG. 16 is a sixth variation of the screen view of the scheduling screen of the lighting control application.

As shown in FIG. 16, the object 238 has been taken out-of-schedule, and therefore the corresponding control device is operating out-of-schedule. The control device is taken out-of-schedule when the corresponding interface object is moved to the out-of-schedule window 252. The interface object may be dragged and dropped from the in-schedule window 250 to the out-of-schedule window as shown by the arrow 251a. When a control device and its corresponding interface object are out-of-schedule, the control device will operate according to the system wide default parameter for out-of-schedule control devices. In one embodiment, the out-of-schedule parameter sets out-of-schedule control devices to 100% power/intensity. In another embodiment, the out-of-schedule parameter sets the out-of-schedule control devices to 0% power/intensity. FIG. 16 shows that the out-of-schedule control device corresponding to object 238 is set to 100% power/intensity. Having an out-of-schedule window 252 allows the administrator to easily move one or more control devices out of the schedule, by moving their corresponding interface object, but maintain an association between the control device and its in-schedule window 250. This makes it easy to put a control device back into a schedule and to know which schedule it should be put back into, particularly when multiple schedules are utilized. In some embodiments, the user can change intensity manually by right clicking on the interface object corresponding to a control device, which will move the device automatically to the corresponding out-of-schedule window.

Referring to FIG. 6, each schedule window has a move into schedule button 256 and a move out-of-schedule button 258. When the move out-of-schedule button 258 is selected by a user or administrator all of the interface objects and corresponding control devices that are in the in-schedule window 250 are automatically moved to the out-of-schedule window 252. When the move into schedule button 56 is selected by a user or administrator all of the interface objects and corresponding control devices that are in the out-of-schedule window 252 are moved to the in-schedule window 250.

The screen 233 has a move all out-of-schedule button 251 and a move all into schedule button 253. When the move all out-of-schedule button 251 is selected by a user or administrator all of the interface objects and corresponding control devices in all in-schedule windows, e.g. windows 250, 250a, etc., will move to the corresponding out-of-schedule windows, e.g. 252, 252a, etc. When the move all into schedule button 253 is selected by a user or administrator all of the interface objects and corresponding control devices in any out-of-schedule window, e.g. 252, 252a, etc., will be moved to the corresponding in-schedule window, e.g. 250, 250a, etc.

Input Control and Event Reaction

Figure 17:
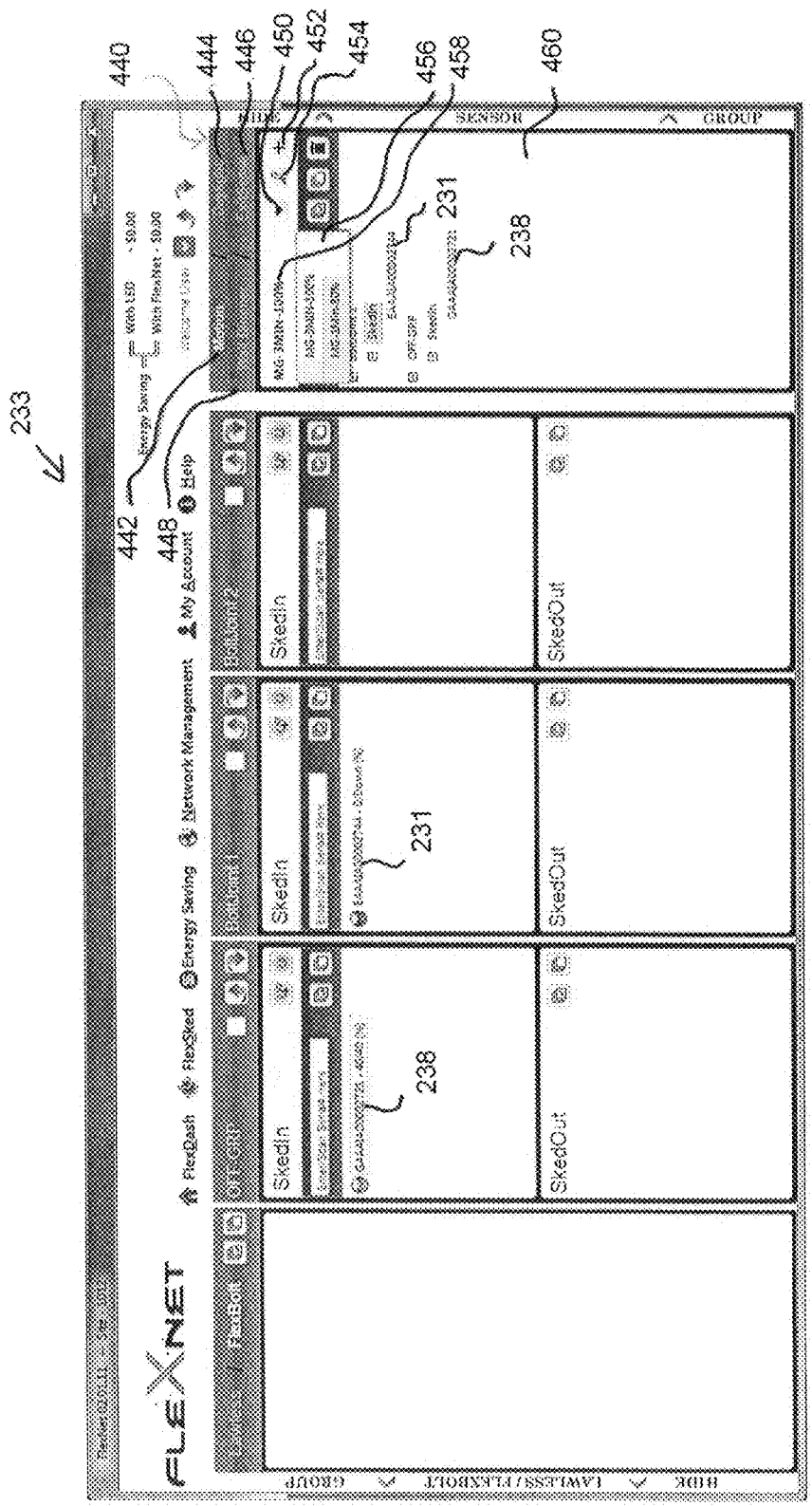
FIG. 17 is a seventh variation of the screen view of the scheduling screen of the lighting control application.

The screen 233 has an input control panel 440 located on the right of the screen shown in FIG. 17. The input control panel 440 has a number of tabs including a motion tab 442, a light sensor tab 444, an exit light sensing tab 446, and a wall dimmer tab 448. The motion tab 442 is shown at the forefront in FIG. 17. The input control panel 440 has a select button 450, an edit button 454, an add button 452, and a display window 460. The function of the buttons 450, 452, 454 and the display window 460 depends on which tab 442, 444, 446, 448 is selected.

Motion

In some embodiments, the control device is connected to the motion sensor 162c. When the motion tab 442 is selected the system displays, in the window 460, the interface object corresponding to control devices that are in a motion group corresponding to the motion group selected and shown in the title area 458.

When a user selects the select button 450, a drop-down box 456 appears listing the motion groups that are currently defined in the system, e.g. MG-3MIN-100%, MG-IMIN-80%. When a motion group is selected, its title will be displayed in the title area 458. FIG. 17 shows the motion group corresponding to the motion group titled MG-3MIN-100% in the window 460. Control devices corresponding to interface object 231, 238 are a part of the motion group titled MG-3MIN-100%. Control devices, such as end units or gateways, that have a motion sensor attached can be added to the motion group by dragging and dropping the corresponding interface object into window 460. Alternatively, a control device and corresponding interface object can be added by entering the serial number of the corresponding control device into a manual entry box (not shown) of the window 460. The interface objects 231, 238 are shown in a tree fashion which illustrates their corresponding schedule (e.g. OFF-GRP for object 238) and whether it the corresponding control devices in schedule (indicated by SkedIn for object 238) or out-of-schedule within a given schedule.

Figure 18:
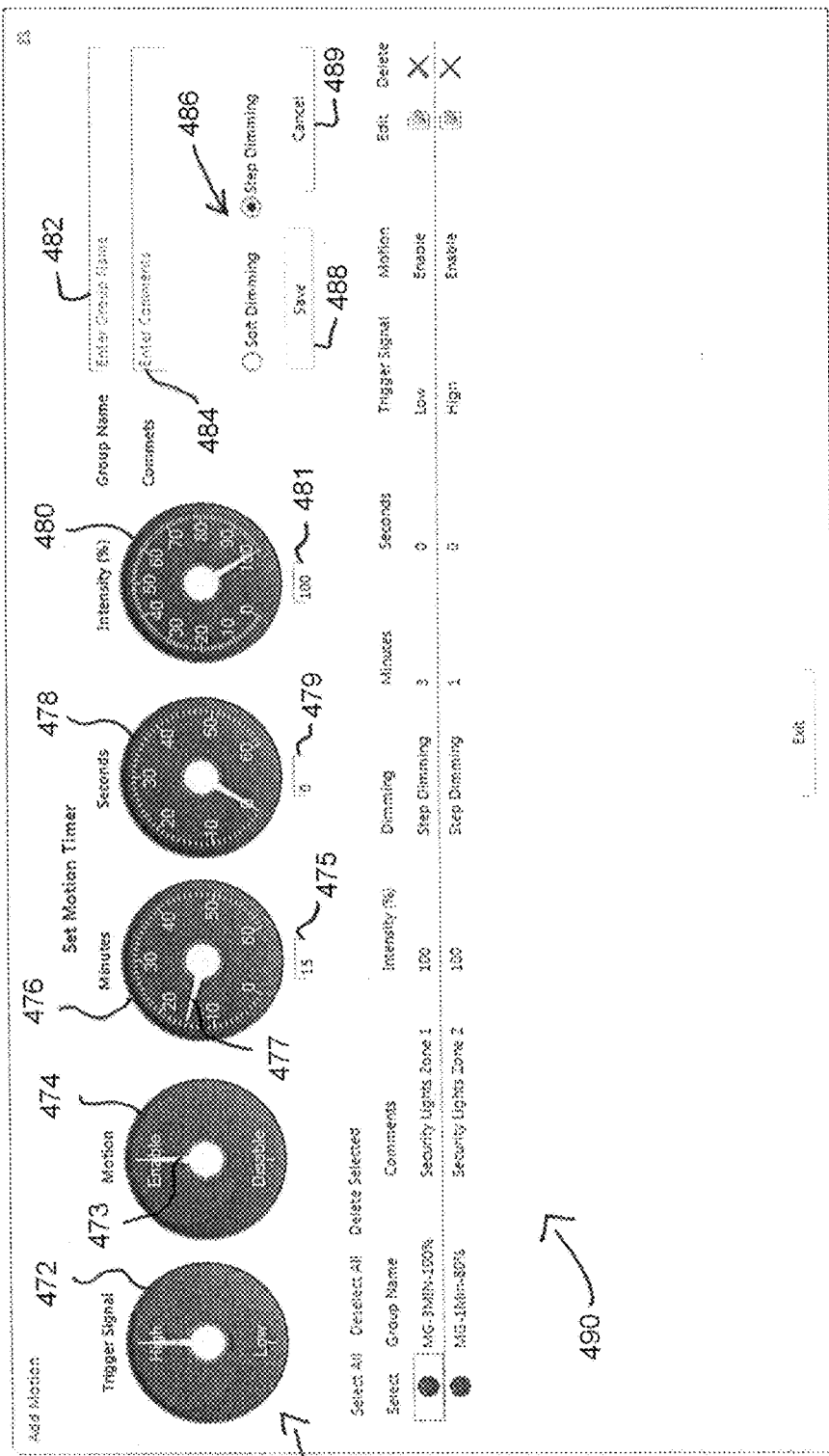
FIG. 18 is an add motion schedule window of the lighting control application.

Selecting the add button 452 causes an add motion schedule window 470 to open, as shown in FIG. 18. The add motion window 470 as an upper settings portion 471 and a lower motion table portion 490. The upper settings portion 471 has a trigger signal dial 472, a motion status dial 474, a motion timer setting section comprising a minute dial 476 and a second style 478, an intensity dial 480, a group name box 482, a comments box 484, a dimming type section 486, a canceled button 489, and a save button 488.

The trigger signal dial allows the user to select whether the connected sensor triggers on a high signal or a low signal. In some embodiments, the motion sensor 162c will be configured to report 10 or 24 volts (or 100 k ohms) during normal operations (no detectable motion within the sensor range) and a zero volts (or 0 ohms) signal when a motion event occurs within the range of the motion sensor. This is an example of a low trigger signal configuration. In some embodiments, the motion sensor will be configure to report a 10 or 24 volt (or 100 k ohms) when motion is detected, but a zero volt (or ohm) signal during normal operations when no detectable motion is within the sensor range. This is an example of a high trigger signal configuration. Therefore the user can set at the trigger signal dial 472 whether the sensor being utilized has a high or low signal to indicate motion within the range of the motion sensor. Any pair of high/low or low/high volt values (e.g. 0 and 10, 10 and 0, 0 and 24, 24 and 0, etc), or current values (e.g. 0 to 1, 1 to 0, etc.), or resistance values (e.g. 0 to 100 k ohms, 100 k ohms to 0, etc.), or other values or signals can be trigger signals. The motion status dial 474, allows a user to a set whether motion detection is enabled with the corresponding group or disabled. A user may want to disable the motion detection function for a group for a period of time. The motion status dial 474 allows a user to turn off the motion function for a motion group.

To create a new motion group, the user will specify the settings in an upper settings portion 471 of the window 470. The user will designate a group name in the group name box 482 and the user will optionally enter any comments in the comment box 484. The motion timer setting allows the user to set the duration of time that the motion event will occur. Therefore, if the motion event is to turn on a light to a particular intensity when motion is detected, then the motion timer setting would define how long the light would stay on after motion was detected. The user will use the minute dial 476 and the second dial 478 to define duration of time that the control device will operate under the motion event condition. The user will use the intensity dial 480 to set the intensity at which the control device will signal the light to operate during the motion event condition. The user can then select whether the transition at the beginning of the motion event will be done by soft dimming or by step dimming in the a dimming type section 486. Then the user will select the save button 488 and the motion group will be added to the table 490 and the database 103. A motion group can be edited by selecting the edit icon adjacent thereto. The motion group can be deleted by selecting the X in the delete column as shown in FIG. 18.

Figure 19:
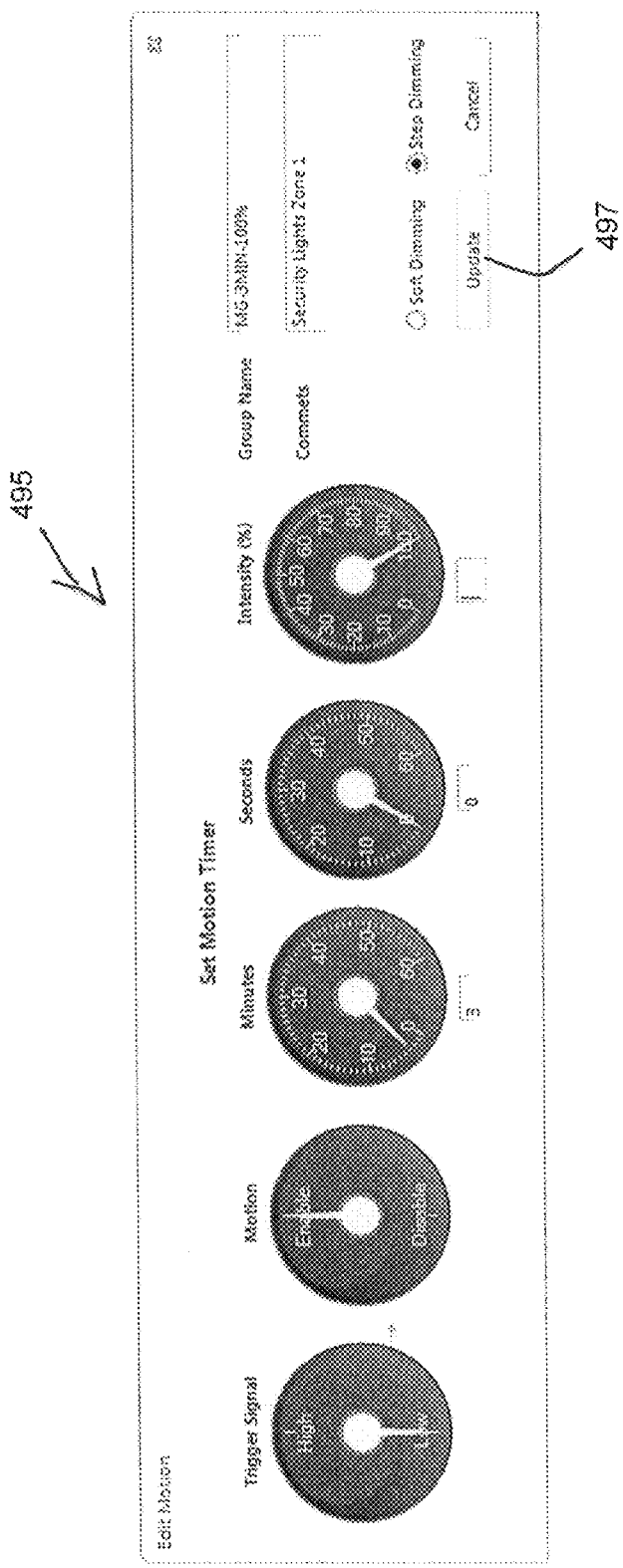
FIG. 19 is an edit motion schedule window of the lighting control application.

Referring again to FIG. 17, if the edit button 454 is selected an edit motion schedule window 495 will appear as shown in FIG. 19, which allows the user to edit the settings related to the corresponding group that is selected in designated in the title area 458. The settings are identical to those shown in FIG. 18, and when adjusted, the user can select the update button 497 to change the settings with respect to the corresponding motion group in the database 103.

Light Sensing.

Figure 20:
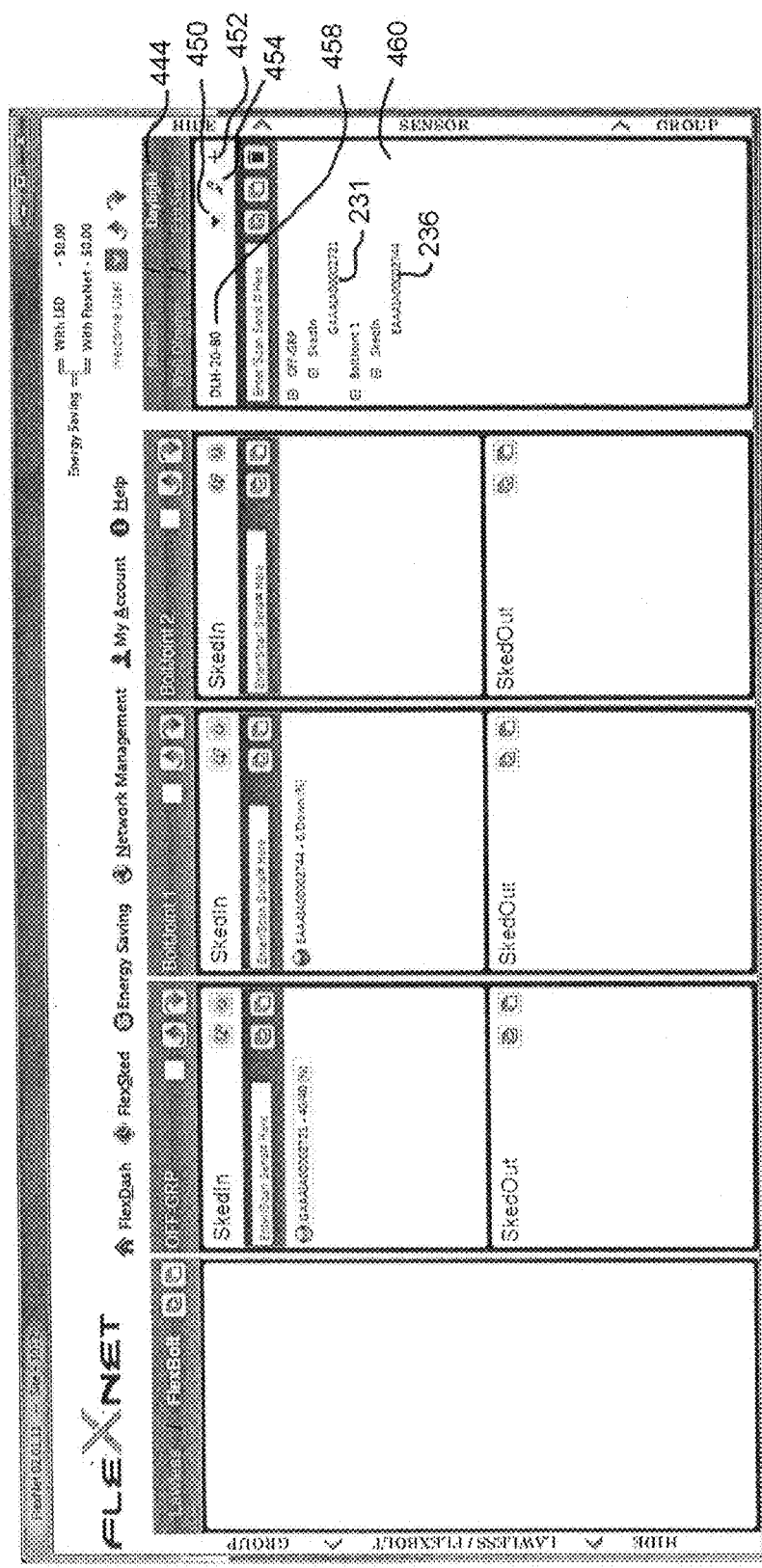
FIG. 20 is an eighth variation of the screen view of a scheduling screen of the lighting control application.

FIG. 20 shows the light sensor tab 444 is selected. A light sensor group DLH-20-80 is shown in the window 460 as indicated in the title area 458.

Figure 21:
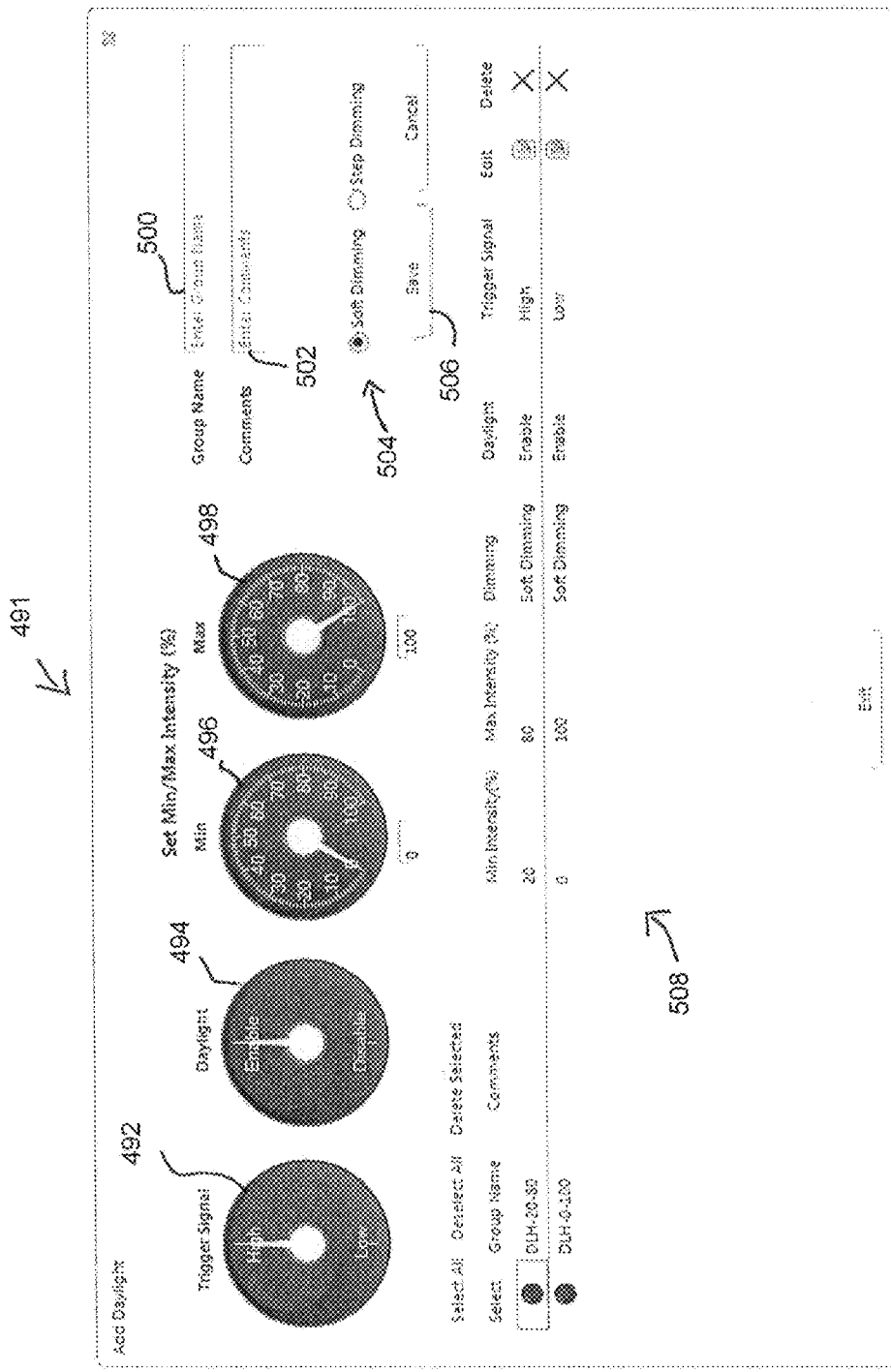
FIG. 21 is an add light sensing group window of the control application.

When a user selects the add button 452, when the light sensor tab 444 is shown/selected, the system will display an add light sensing group window 491, as shown in FIG. 21. The light sensing group window 491 has a trigger signal dial 492, a enable/disable dial 494, a minimum intensity dial 496, a maximum intensity dial 498, a group name box 500, a comment box 502, a transition dimming type area 504, save 506 and cancel buttons, and a lower light sensor table portion 508.

To add a light sensing group to the table 508, the user will enter a light sensing group name in the group name box 500. The user will indicate whether light sensing events are reported with a high signal or a low signal on the trigger signal dial 492. In some embodiments, the light sensor 169*a* will be configured to report 10 or 24 volts when sensing full light at the sensor and a zero volts signal when detecting no light at the sensor. This is an example of a high trigger signal configuration. In some embodiments, the motion sensor will be configure to report a 10 or 24 volt (or 100 k ohm) when no light is reported at the sensor and a zero volt (or ohm) signal when full light is detected at the sensor. This is an example of a low trigger signal configuration. Therefore the user can set at the trigger signal dial 492 whether the sensor being used has a high or low signal to indicate light detected at the sensor.

The enable/disable dial 494 allows a user to set whether light sensing is enabled with the corresponding group or disabled. This allows a user to turn off the light sensing function for a group.

The minimum intensity dial 496 and the maximum intensity dial 498 are used to set a minimum light intensity value and a maximum light intensity value respectively. The minimum light intensity value corresponds to the minimum light that will be provided if any light intensity is requested between 0 and the minimum light intensity value. For example, if the minimum light intensity value is 20%, and the light sensor reports a signal that indicates 10% intensity should be provided, the control device will instead direct that 20% intensity light be provided because the 10% is below the minimum light intensity of 20%. Therefore if the light sensor reports a signal that indicates any intensity between 0% and 20% the system will provide 20% light intensity. If the light sensor reports a signal that indicates 0% intensity should be provided, then the system will cause 0% intensity (no light) to be provided at the corresponding light.

The maximum light intensity value corresponds to the maximum light that will be provided if any light intensity is requested between the maximum light intensity and 100% intensity. For example, if the maximum light intensity value is 80%, and the light sensor reports a signal that indicates 90% intensity should be provided, the control device will instead provide 80% intensity light because the 90% intensity is above the maximum light intensity of 80%. Therefore, if the light sensor reports a signal that indicates any intensity between 80% and 100% the system will provide 80% light intensity.

In one embodiment, the light sensor has a 0-10 volt reporting signal. A 10 volt signal corresponds to the sensor detecting full light at the sensor. A zero volt signal corresponds to the sensor detecting no light at the sensor. The sensor will report the connected control device a signal between zero volts and 10 volts to indicate a corresponding level of light detected between no light detected and full light detected. Therefore, if the sensor detects 50% light intensity, then it will report 5 volts. If the sensor detects 82% light intensity, then it will report 8.2 volts.

The system maps light intensity values corresponding to the reported signal.

If the light sensor has a 0-10 volt reporting signal, has a low trigger signal, and the maximum light intensity value 100% and the minimum light intensity value is 0, the system will map a 10 volt signal to 0% light intensity, a 9 volt signal to 10% light intensity, a 8 volt signal to 20 percent, etc. continuing to a 1 volt signal to 90% light intensity, and a 0 volt signal to 100 percent intensity. Therefore lighting can automatically be increased to compensate for less external light, such as daylight, and can be automatically decreased when more external light is sensed at the sensor.

The system may provide light sensor signal to intensity mapping on any degree of increments or ranges. Therefore in some embodiments, the system will map each percentage light intensity integer to a corresponding signal value, e.g. 1.1 volts to 89% light intensity, 1.2 volts to 88% light intensity, etc. As a further example, the system could map a 1.11 volt signal to 88.9% light intensity. When the signal is provided in resistance (ohms) or other signal types, a similar mapping can occur between the light intensity percentage and the signal received. The mapping may be achieved by any method known in the art, such as by providing a mapping table, or by providing a formula that calculates the mapping dynamically or at predefined times. In some embodiments, reference to a percent light intensity may correspond to a percent power provided to the lighting as instructed by the control device.

If the maximum light intensity value is set to 80% and the minimum light intensity value is set to 20% in the above example, the system will map a 10 volt signal to 0% light intensity, any signal below 10 volts to 8 volts to a 20% intensity, a 7 volt signal to 30% intensity, etc. continuing to any signal between 2 volts and 0 volts to 80 percent light intensity.

The user may enter comments in the comment box 502. The user may designate whether soft dimming or step dimming will be used during changes in lighting intensity in the transition dimming type area 504. The user may select the save button 506 to save the settings and add the light intensity settings to the light sensor table portion 508. Alternatively the user may select the cancel button adjacent the save button to discard the settings entered and start over.

Any of the light sensor groups can be edited by selecting the edit icon in the table 508. In which case the values from the light sensor group will be populated into the corresponding dials 492, 494, 496, 498 and the appropriate values placed in the group name box 500, the comment box 502 and dimming type area 504. The user can then change any such values and select the save button to save those changes to the light sensing group which will then appear in the table 508. Light sensing groups can be deleted by selecting the X icon in the delete column in the table 508. The user may select the exit button to close the light sensing group window 491.

If the edit light sensing group button is selected, a window similar to that shown in FIG. 19, but the dials 492, 494, 496, 498 and the boxes 500, 502 and the dimming type area 504 will be presented rather than that which is shown in FIG. 18. The user can make changes to the various dials and boxes and select save to make those changes effective and saved in the database.

Exit Sense.

In some embodiments, the end unit and or the gateway will have an exit sense port 162b. The exit sense port is configured to connect to a sensor 162e that detects whether a light illuminating an exit sign is active or burnt out.

Figure 22:
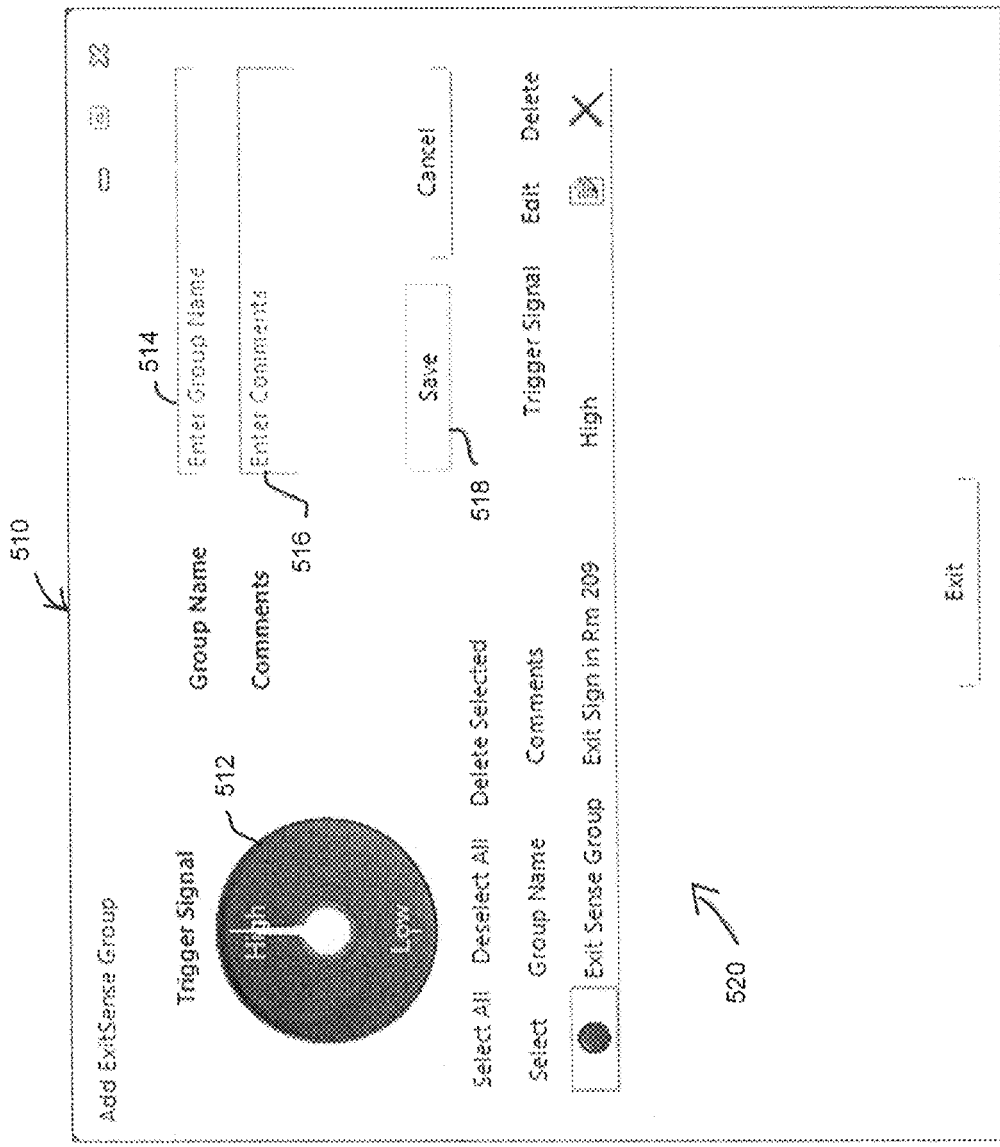
FIG. 22 is an add exit sense group window of the control application.

When the exit sensing tab 446 is selected, the system will show interface objects corresponding to control devices that have been assigned to an exit sense group in window 460. If the add button 452 is selected an add exit sense group window 510 will appear, as shown in FIG. 22. The window 510 has a trigger signal selector 512, a group name box 514, a comment box 516, save and cancel buttons, and an exit sense table 520.

To create an exit sense group, the user will enter an exit sense group name in the group name box 514. The user will enter any comments in the comment box 516. The user will select whether a high or low signal indicates whether the exit light is burnt out or not operating using the trigger signal selector 512. The user will select the save button to save the exit group to the exit sense group table 520.

Figure 23:
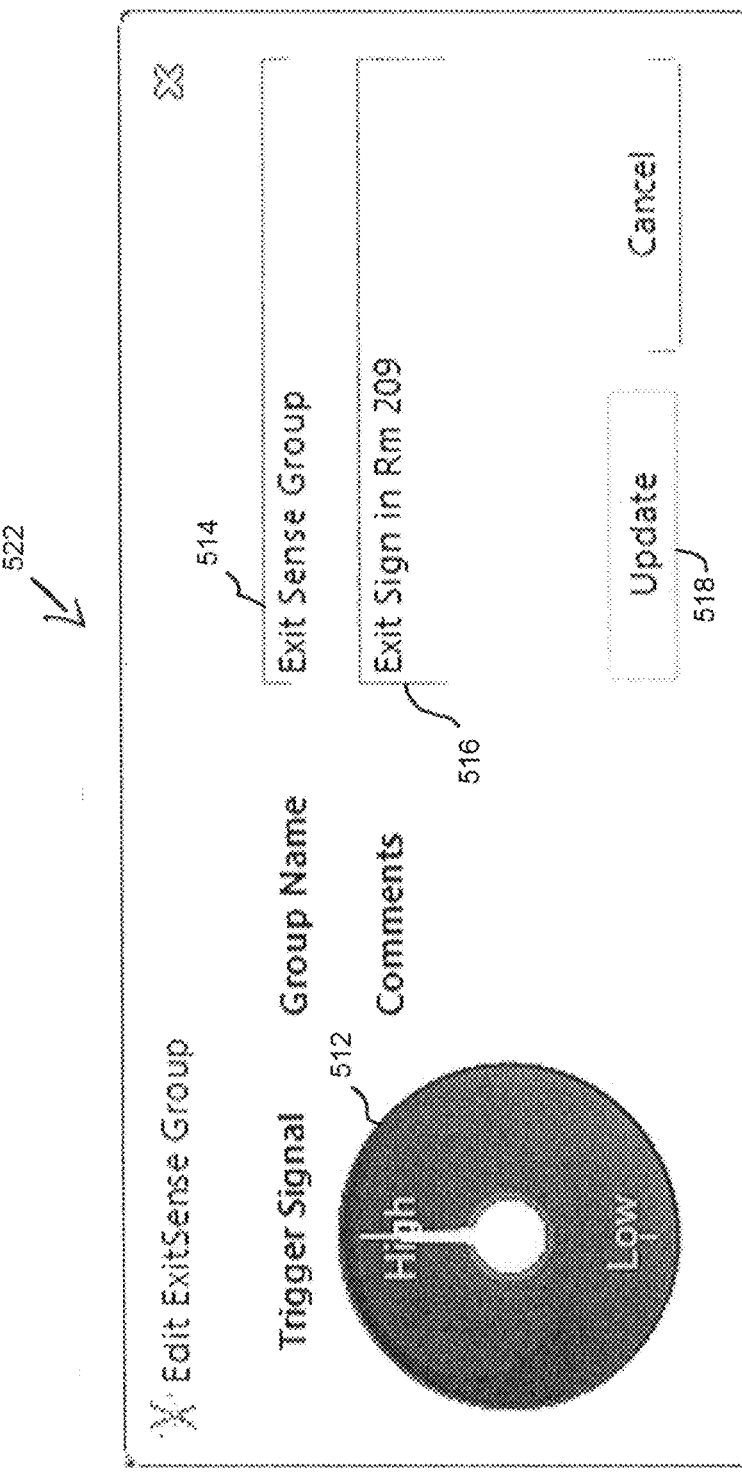
FIG. 23 is an edit exit sense group window of the control application.

If the edit button 454 is selected, then the edit exit sense group window 522 will appear, as shown in FIG. 23. There the user will be able to change the settings at the trigger signal selector 512, the group name box 514, and the comment box 516. Once sensor is triggered, the system will record time stamp corresponding to the time the sensor changed state to a computer data file or database of the system.

Wall Dimmer.

When the Wall Dimmer tab 448 is selected the wall dimmer group(s) will be displayed in window 460. The wall dimmer groups allow the system to receive input from wall dimmers. When the control device receives input from a wall dimmer the wall dimmer settings will override one or more of the schedule settings for a predetermined wall dimmer period of time.

Figure 24:
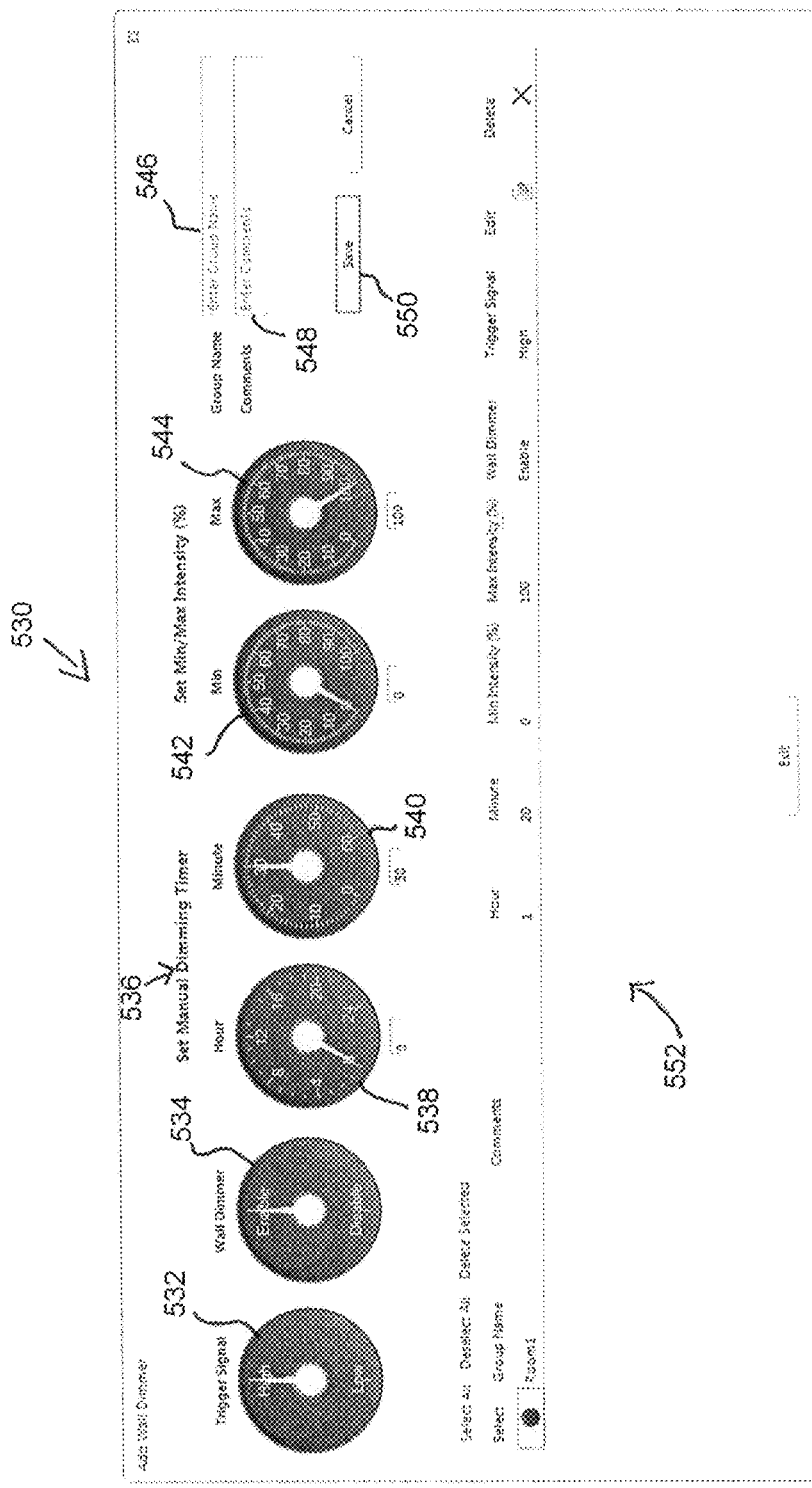
FIG. 24 is a dimmer schedule window of the control application.

In some embodiments, the end unit or the gateway comprise a wall dimmer port 162a where a wall dimmer control signal can be received from a wall dimmer 162d. FIG. 24 shows the wall dimmer schedule window 520, which is called by selecting button 452 when the wall dimmer tab 448 is selected.

The dimmer schedule window 530 has a trigger signal dial 532, a wall dimmer enable/disable dial 534, a dimming timer setting section 536 having an hour dial 538 and a minute dial 540, a minimum intensity dial 542, a maximum intensity dial 544, a group name box 546, a comment box 548, a save button 550 adjacent to a canceled button, and a wall dimmer table 552.

The trigger signal dial 532 is selectable between a high signal or a low signal. The manual dimming timer setting 536 allows a user to set the wall dimmer period of time during which the wall dimmer will override scheduled settings. The wall dimmer period of time is expressed in the hours and minutes corresponding to the values set on the hour dial 538 and the minute dial 540. In the example shown in FIG. 24, the wall dimmer period of time is zero hours and 30 minutes. The wall dimmer period of time allows the system to enable manual operation via a wall dimmer but to put the lights connected to the wall dimmer back on the schedule after the wall dimmer period. For example, if a wall dimmer is used for basketball practice, the administrator might set two hours as the predetermined wall dimmer period of time so that the corresponding lights can go back on the schedule after practice has concluded without requiring any input or change in the wall dimmer by those at the practice session.

The minimum intensity dial 542 and a maximum intensity dial 544 allow the user to set the minimum intensity and maximum intensity for lights under the control of a wall dimmer. For example, if the maximum intensity is set to 80% and the wall dimmer is turned to 100% intensity the control device will instruct the corresponding lights to operate at 80% intensity. Similarly, if the minimum intensity is set to 15% and a wall dimmer is turned to 8% the control device will instruct the corresponding lights to operate at 15% intensity.

A user may enter a group name to identify the wall dimmer group in the group name box 546. The user may enter comments in the comment box 548. After all the settings have been entered on the dials 532 through 544 and in boxes 546 and 548, the user will select the save button 552 to record those settings in table 552. An existing group, such as the Room1 group, can be edited by selecting the edit icon in the table 552 and adjusting any of the corresponding dials 553 through 544 and or the information in boxes 546 and 548. The user may then select the save button to save those changes to the database. A user may delete a wall dimmer group by selecting the X in the delete column of the table 552.

Selecting the edit button 454 when the wall dimmer tab 448 is selected will produce a window that is similar to that shown in FIG. 24, but missing the table 552. The user may adjust the various settings and select the save button on that window to make changes to the corresponding group. Clicking on the select button 450 when the wall dimmer tab 448 is selected will produce a drop-down box similar to the drop down box 456, which allows the user to select among various previously entered wall dimmer groups. When a wall dimmer group is selected the interface object(s) corresponding to a control device(s) is corresponding to that group will be shown in the window 460.

Figure 25:
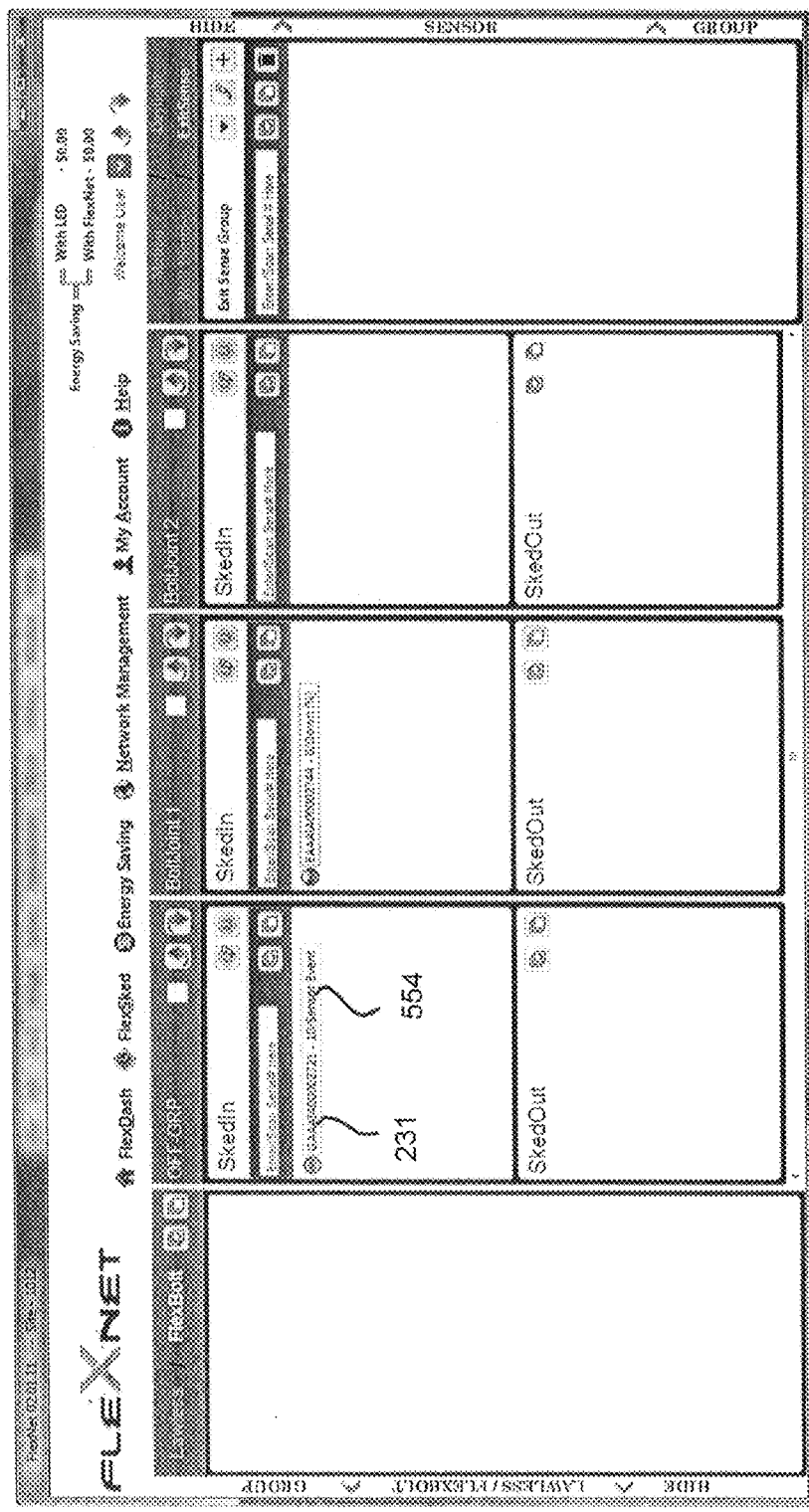
FIG. 25 is a ninth variation of the screen view of a scheduling screen of the lighting control application.

If a control device is a member of a group that is within an input control group, such as a motion group, a daylight group, and a wall dimmer group, or an exit sense group, and an input corresponding to that input control group is detected the interface object corresponding to the control device, such as object 231, will indicate that the sensor event has occurred by providing a sensor event indicator 554 adjacent the name of the object 231 as shown in FIG. 25. Therefore the administrator will know that the control device is operating under the control of an input control group and not under a normal schedule.

Custom Categories.

In some embodiments, the system allows the user to create custom categories, within which groups can be created, similar to the motion, in daylight, wall dimmer, exit sense categories. However if a custom category is created, the user can define what types of settings can be adjusted for groups within that category within. Custom categories can allow the user to adjust the minimum intensity and the maximum intensity settings such as shown at 542, 544, duration settings such as shown at 536, event trigger signals such as shown at 474, and/or sensor enable/disable features.

While motion, light, and dimmer sensors/input have been disclosed, the control devices 108, 112 can be configured to receive sensor/trigger input from any device. For example, sensor/trigger input can be received from a temperature sensor, a smoke detector, a carbon monoxide detector, a vacuum sensor, a audible sound sensor, a pressure sensor, a humidity sensor, a pulse sensor, a magnetic sensor, a speed sensor, a friction sensor, a resistive sensor, a level sensor, an acceleration sensor, a vibratory sensor, a current sensor, a voltage trigger, a chemical sensor, a radio frequency sensor, an atomic sensor, an electromechanical sensor, a mechanical sensor, a heat sensor, or any other sensor. Custom groups can be created to provide instructs for changing lighting or sensing alert signals based on triggers/events detected from sensors attached or in communication with to a control device.

Instructing the Devices

All of the settings corresponding to the various control devices, schedules, and input control groups are recorded in one or more databases 103 of the control application 101. In some embodiments, the system generates a schedule message containing scheduling information and input control group information for each control device 112, 108 registered with the system. The scheduling message contains information which the receiving control device is configured to read and understand regarding a schedule. The scheduling message is transferred from the application server 102 to the control device. If the control device is an end unit, then the scheduling message is relayed to the end unit by at least the gateway, and possibly by one or more other end units. The control device records the scheduling message in its memory. The processor of the control device then reads the scheduling message and carries out the lighting instructions according to the scheduling message. Further, the control device determines from the scheduling message whether to monitor and report messages or input received from the ports 169, 162, 162*a*, 162*b*, 162*g*.

Each control device has a date and time function executable by the device processor. In one embodiment, the control application sends a message, such as the scheduling message, containing the present date and time. The control device sends the present date and time to the date and time function that keeps track of the current date and time in the device. The current date and time is used by the device to determine how it should instruct lights according to the schedule stored in its memory.

The control device does not need to be in constant communication with the control application 101. The control device will operate based on the schedule provided according to the most recent scheduling message received and stored on the device memory, until a new schedule is received or until the device looses power. If the control device is in communication with the control application 101, it will report to the control application the current light intensity of a correspondingly connected light(s) and whether a sensor event is occurring such that the device is operating out-of-schedule according to a sensor event condition.

When a change is made to any schedule using the control application 101, the control application sends a new scheduling message to each effected control device. The new scheduling message contains an updated schedule reflecting the changes made by the user in the control application. The control device will then record the new schedule in its memory and operate based on the new scheduling message.

Sensor Events within Groups

In some embodiments, when one control device within the group senses an event, such as motion if the input control group is a motion group, then all of the control devices within that input group will react to that event. For example, if the group is a motion group comprising 10 end units and if the motion group is configured to 80% intensity when motion is sensed, then if one end unit receives a motion signal from a connected motion sensor on its motion sensor port, it will report this event to the group of end units through the network 110 and all the 10 end units will signal their attached lights to 80% intensity. In this way, a sensor on any end unit can cause a sensor event condition in all of the end units of the group. Therefore, end units are configured to listen for control group event signals from other end units. Likewise end units are configured to broadcast control group event signals when an event occurs.

In some embodiments, it is not necessary for the control device to report the sensor event to the control application in order to cause the other members of the group to enter the corresponding event condition. Instead the sensing control device will communicate the event to the other members of the group directly or across any number of hops within the network 110. The receiving control devices will move to an event condition according to the schedule in its memory. When the event condition expires the control devices will return to its regular schedule.

System Defaults

Figure 26:
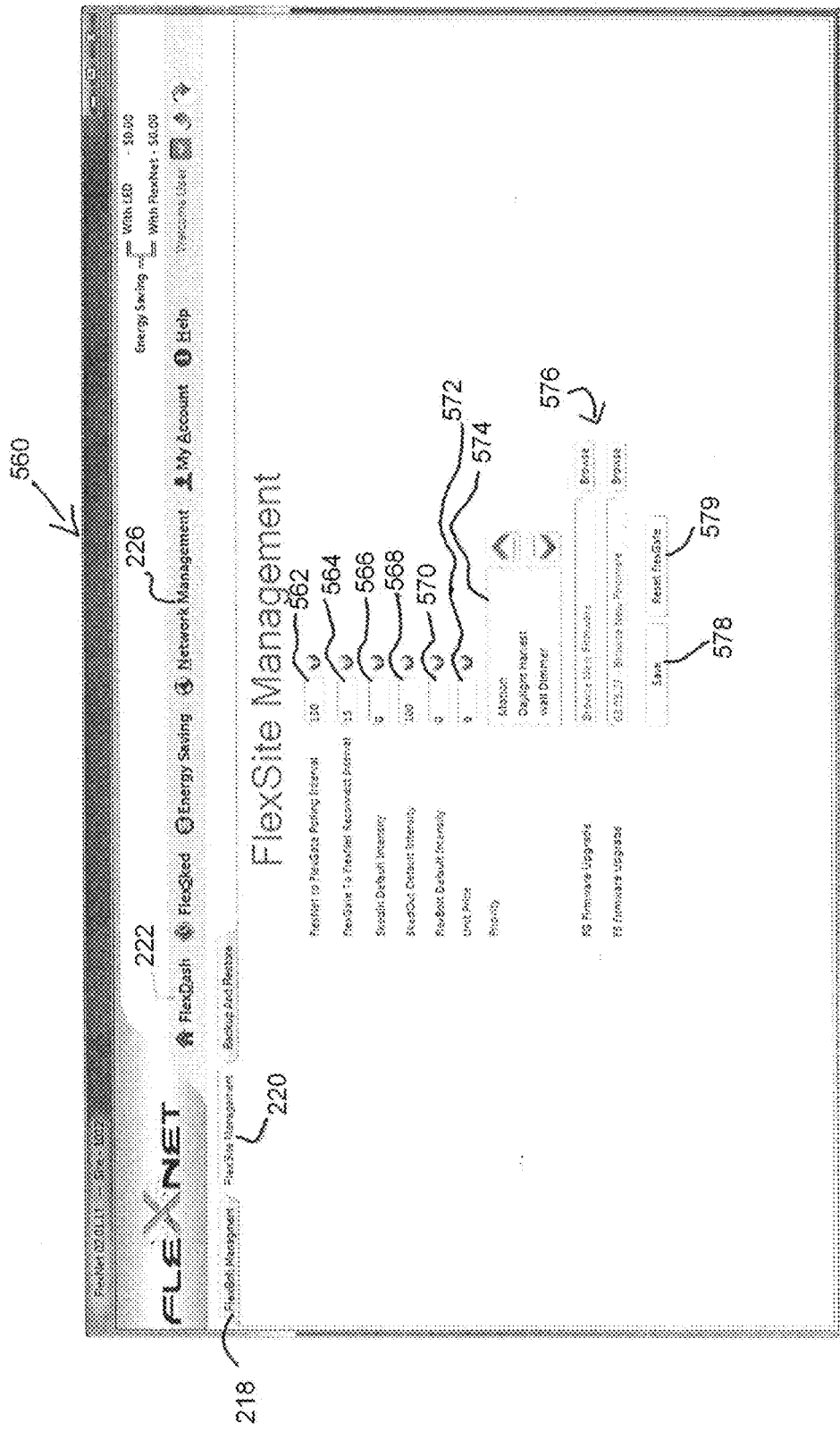
FIG. 26 is a site management control screen view of the control application.

A user may set certain system defaults in a system management window 560 corresponding to the site management tab 220, shown in FIG. 26. The system management window 560 has a system to gateway polling interval box 562, a gateway to system reconnect interval box 564, an in-schedule default intensity box 566, an out-of-schedule default intensity box 568, a device default intensity box 570, a unit price box 572, and a priority box 574, a firmware upgrade section 576, a save button 578, and a reset system defaults button 579.

The system to gateway polling interval box 562 is where a user can define the time interval that the control application will check that it is in communication with a gateway. The gateway to system reconnect interval box 564 is where a user can define the time interval between attempts by the gateway to connect with the control application. The in-schedule default intensity box 566 allows the user to define the intensity that control devices will cause the attached lighting to operate at when in-schedule, if no schedule specific intensity is provided for the given date/time. The out-of-schedule default intensity box 568 allows the user to define the intensity that devices will cause the attached lighting to operate at when out-of-schedule. The a device default intensity box 570 allows the user to specify the default intensity that any control device that is registered with the system will cause the attached lighting to operate at if not instructed otherwise by a schedule or event.

The unit price box 572 allow a user to provide the cost of operating a light unit attached to a control device so that the control application can calculate the energy cost related to the operation of one or more lights connected to a corresponding control device. The priority box 574 allows the user to specify the priority order events (such as a motion event, a light sensor event, or a wall dimmer event, etc) will operate. Any number of other triggers/sensor conditions can be prioritized in the priority box 574. In the example shown in FIG. 26, motion events have the highest priority, daylight sensing events have the second highest priority, and wall dimmer events have the third highest priority. Therefore, if a device is operating under a wall dimmer event condition and the control device is a part of a motion group that receives a motion event trigger, the motion event will take control and the device will operate under the motion event group even if the wall dimmer event is simultaneously occurring.

Once the motion event group instructions expire, then the device will return to operating under the wall dimmer group condition, as long as that wall dimmer group condition has not expired during the time when the motion event was active. If the wall dimmer group condition did expire, then the device would go back to operating according the lighting schedule that it is assigned to (or if the device was in an out-of-schedule condition before the event, then it would go back to operating according to the out-of-schedule instructions).

Therefore, when one event/trigger condition expires, the device will operate under the immediately preceding event/trigger condition or schedule if such immediately preceeding event/trigger condition or schedule is still active. If immediately preceding condition or schedule is expired, then the devices will fall back to operating on the second preceding condition if such second preceding event/trigger condition or schedule is still active. If the second preceding condition is expired, then the device will fall back to operating on the third preceding event/trigger condition or schedule if such second preceding event/trigger condition or schedule is still active, etc. The device will fall back through any number of preceding conditions/schedules until an active condition or schedule is reached and will then operate on that active condition or schedule.

Multiple Dimming Rates

In some embodiments, the soft dimming function comprises non-linear dimming across the entire range when dimming up between 0% and 100% and when dimming down between 100% and 0%. Dimming may progress at a first rate along a first range of intensity and a second rate along a second range of intensity.

Figure 27:
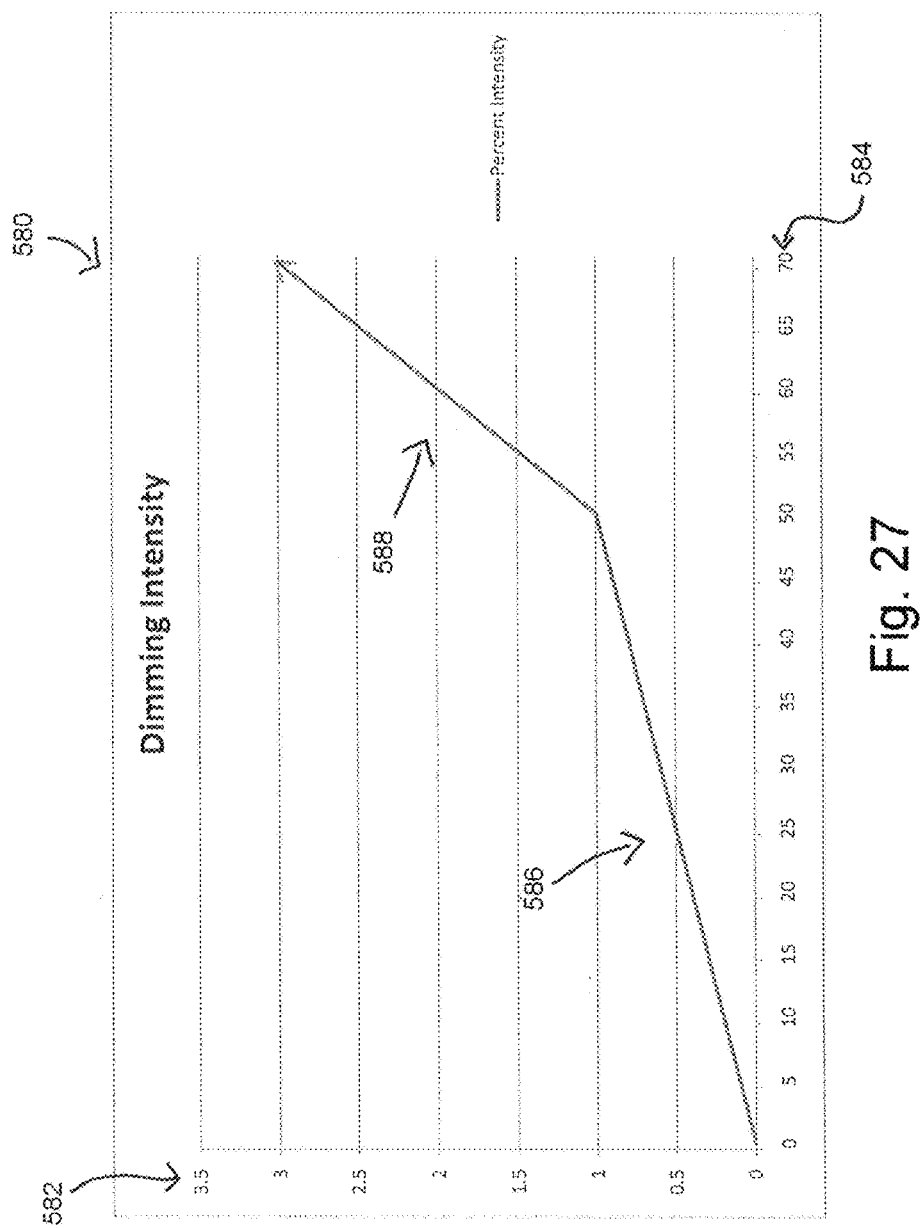
FIG. 27 is a dimming rate graph showing an exemplary embodiment of a non-constant rate dimming function of the system.

FIG. 27 provides a graph of intensities by step in one embodiment of multiple rate dimming. The light intensity percentage 582 is provided on the y-axis. The steps 584 are provided on the x-axis. In the embodiment shown, soft dimming occurs via a plurality of small set changes in light intensity. This is in contrast to step dimming where large steps transmission to the desired intensity. Step dimming may move in steps of 20% intensity, e.g. 100%, 80%, 60%, etc. Soft dimming utilizes smaller changes in intensity.

In one embodiment, the control device transitions from one intensity to the next in increments of 0.1% intensity increments. The device has a 0.03 second delay between each step increment. Therefore there will be 200 intensity steps between 100% and 80% and it will take 6 seconds to traverse the 200 steps to dim down from 100% to 80%. This rate of 0.1% intensity increment rate is shown as the second dimming rate line 588 in FIG. 27, from 1% intensity upwards to 100% intensity. The truncated range between 1% and 3% is shown in FIG. 27. A different first intensity rate, as shown by the first dimming rate line 586, is provided for dimming up or down between 0% and 1% intensity. The first dimming rate changes intensity at a rate of 0.02% per step. Therefore there will be 50 steps between 0% and 1% intensity. The device has a 0.03 second delay between each step increment. Therefore to go from 0% to 1%, or vice versa, it will take 1.5 seconds at the first dimming rate given a 0.03 second delay.

It has been recognized by the present inventor some LEDs do not transition smoothly through all ranges of intensity. The present inventor has recognized that prior art systems do not dim LEDs smoothly across the entire intensity spectrum between 0 and 100%. Particularly it is been recognized that certain LED lighting provides inconsistent dimming between zero and one percent intensity.

Therefore it is preferred to have a system and device that is capable of varying the dimming rate so the corresponding light appears to the human eye to be dimming smoothly and consistently, when actually the rate of power reduction/increase (intensity reduction/increase) is not constant. The differing rates of dimming compensate for characteristics of particular lighting. While the example above provides a dimming process with two dimming rates, any number of dimming rates could be used along the spectrum between 100% intensity and 0% intensity. In some embodiments, the 3, 4, 5, 6, 7, or more dimming intensity rates are used during given ranges within the overall range of 100% intensity and 0% intensity. In some embodiments, the first rate extends from 0 to 20 percent intensity, the second rate extends from 20 to 50 percent intensity, and a third rate extends from 50 to 100 percent intensity. Furthermore, different delays between each transition to the next dimming intensity can be used other than a 0.03 second delay. In some embodiments, the delay is between 1 second and 0.001 second.

Site ID

When a control device that is already registered and has previously received a schedule message powers down and then powers back on, it will still have the most recent schedule in its memory. However, the device will not know what the current date and time is because it will not know how long it was powered off. Therefore the device will receive the current date and time information from another registered end unit or gateway. Once the end unit knows the current date and time it can resume the schedule saved in its memory.

In order for the end unit device to more quickly find the proper network having the gateway 108 upon power up, the device registration process may be modified so that when a device is registered with the system, the system assigns the device a unique site ID. The end unit(s) and the gateway save the site ID to the local memory on each respective device. Then the end unit will only attempt to connect with devices having the same site ID upon power up of that device.

Figure 5C:
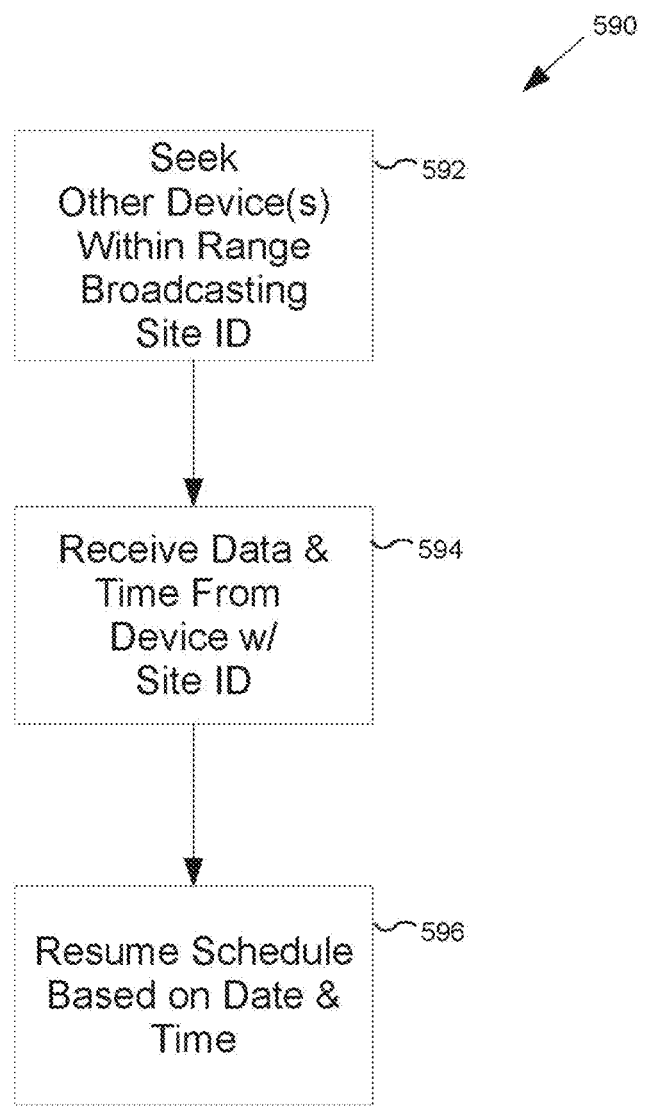
FIG. 5C is a flow diagram of a device connect process of a control device of the lighting control system.

FIG. 5C illustrates one embodiment of a device connect process 590 for an end unit when the end unit was previously registered with the control application 101. In this embodiment each device that is registered with the control application 101 has a site ID recorded in the memory of the device. The gateway 108 will broadcast the site ID received from the control application to the end units and the end units will relay and route the broadcasted site ID to other end units. Also the end units themselves may broadcast the site ID. The site ID stays in the memory a control device even if the device loses power.

When the end unit powers back on, at step 592, the end unit will only connect with a gateway or end unit that is broadcasting a site ID that matches the site ID saved in the end unit's memory. Therefore the end unit will compare its site ID to site ID received from a broadcasting gateway or from another broadcasting or repeating/routing end unit. If the processor of the end unit discovers a match between its site ID and a broadcasted site ID, the end unit will connect to the device (gateway or other end unit) that is broadcasting a matching site ID. At step 594, the end unit will receive the current date and time from the device that it connected to having a matching site ID. The end unit might query the connecting device for the current date and time or the connecting device might broadcast the current date and time together with the site ID or separately after connecting.

Once the end unit knows the current date and time, at step 596, it will resume the lighting schedule that is stored on its internal memory until it receives schedule change instructions from the control application.

It is possible that a powering up end unit will connect with another online end unit even if the gateway is down. The online end unit will broadcast its site ID. The powering up end unit will connect with the online end unit and will receive the current date and time from the end unit. Once the end unit is registered with the control application and has received a control schedule and knows the current date and time, the end unit can continue to operate even if it loses connection with the gateway, the control application, and/or all of other end units.

When an end unit powers up after losing connection or powering off, all that is necessary is that there is at least one other device, such an as gateway or another end unit with the same site ID, that is online and within range of the powering up end unit, so that the powering up end unit can connect to it and receive the current date and time. This allows the powering up end unit to resume its schedule even without communicating to the control application or the gateway.

Further the use of a site ID speeds the time it takes for an end unit reconnect to the network 110 after losing connection and/or power. This is the case because the end unit does not need to connect, timeout, and disconnect, as shown in FIG. 5B, from devices that are not in its network as identified by the site ID.

Channels

In some embodiments, the gateway and end units may utilize a wireless network adapter 160 that has a wireless radio capable of communicating on multiple channels within a given spectrum, such as 16 channels allocated in the 2.4 GHz band, with each channel requiring 5 megahertz (MHz) of bandwidth.

If the gateway and all end units are communicating on a given first channel and the gateway loses connection to the network 110, such as by losing power, the gateway may come back online using a different channel other than the first channel. In such case, communication between the end units on the first channel and the gateway on the different channel may not be possible.

Therefore, in some embodiments, the end units have a channel scanning function. The channel scanning function causes the end unit(s) with a direct connection (no intermediate network hops through other end units) to the gateway to constantly or periodically scan one or more other channels of the range of channels to detect if the gateway moved to a different channel.

If an end unit detects, through scanning, that the gateway is on a different channel, the detecting end unit will broadcast that change of channel notification message containing the new channel to the other end units in the network 110. When a unit receives notice that the channel has changed, it will change its communications to occur on the new channel, thus again establishing a connection with the gateway, either directly or through any number of network hops.

Illuminated Sign Light Detector

As explained above, in one embodiment, the end unit 112 and or the gateway 108 has the exit sense port. The exit sense port may be connected to the light sensor 162e. The light sensor 162e may be placed within or adjacent to an illuminated exit sign 162f, as shown in FIG. 3.

Illuminated exit signs 162f are often found in buildings, particularly commercial buildings, to show an exit or a path to an exit. The present inventor has recognized a need for a system of determining when the light bulb illuminating the exit sign has burnt out or is no longer functioning. This is important because laws or regulations may require that the exit sign be lit continuously.

When a light sensor 162e is positioned to detect an illuminated exit sign, the light sensor can report whether the exit sign is illuminated. The sensor may report the lack of light or the presence of light and the system can be configured using the trigger signal indicator 512 correspondingly. When the control device detects that the sensor reports that the sensor is not detecting light from the light of the exit sign, the control device will send a message to the control application 101 through the network 110. If the control device reporting the loss of light from an exit sign is in an exit sense group, such as the group shown in table 520 of FIG. 22, then the control application will generate a message to one or more designated recipient(s), to notify such designated recipient(s) that the light is not functioning. Therefore the light bulb of the exit sign maybe changed or the exit sign otherwise repaired to bring the light back into operation.

In some embodiments, the administrator can designate individuals to be contacted for each exit sense group. This can be accomplished by entering a contact address such as an email address, a phone number, and or a social networking address. The control application can then send an email, SMS text message, or other electronic message to the one or more recipients designated corresponding to the exit sense group. The message may include the exit sense group name and the individual end unit or exit sign corresponding to the end unit so the user knows from the message where to find the exit sign in need repair.

In some embodiments, addresses to receive notice from an exit sense event are designated on a control application wide basis so that these recipient address(es) receive notice of any exit sense event for any exit sense group or any sensor event.

The sensor may be placed inside the exit sign or outside of the exit sign adjacent the illuminated area so that the sensor is within range of the light emanating from the exit sign. While in the above example the monitored device is an illuminated exit sign, the sensor 162e can be used in any application where it is desirable to monitor whether a device is emitting light including infrared light. In some embodiments, the light sensor 162e comprises an infrared sensor.

In some embodiments, the control device has multiple exit sense ports for monitoring multiple exit sign lights or other lights. In some embodiments, multiple exit sign lights or other lights are connected to the single exit sense port 162b. In some embodiments, the end unit does not have a dimming control function but only has an exit sense light monitoring function.

Battery Level Detector

Illuminated exit signs often contain a battery power system to provide backup power so the exit sign will remain lit even if the normal building power is lost to the sign. This allows the exit sign to be lit even when the power is lost to show the exit locations for safety.

In some embodiments, the end unit or the gateway comprises a battery power sensor port 162g. In some embodiments, the end unit and/or gateway comprises a battery power detecting circuit or function in communication with the port 162g that allows the end unit or gateway to read voltage on a battery power line 162h that is configured to be connected to the battery of an exit sign. The device may alternatively be connected to a battery circuit of the exit sign where the battery voltage may be measured.

In some embodiments, the battery power sensor port 162g is connected to a battery power sensor 162i configured to measure and report the battery voltage. The sensor 162i is in-line on the power line 162h or is located at the end of the power line adjacent the battery.

In some embodiments, the control application provides a battery power monitoring group function. Devices can be added to and removed from the battery power monitoring group in the same manner as they are added to an exit sense group. In some embodiments, the administrator may designate a voltage threshold below which a low battery warning will be triggered by the control device of the battery power monitoring group.

As with the exit sense detection above, the administrator can designate individuals to be contacted for each battery monitor group. This can be accomplished by entering a contact address such as an email address, a phone number, and or a social networking address. The control application can then send an email, SMS text message, or other electronic message to the one or more recipients designated corresponding to the battery monitoring group. The message may include the battery monitoring group name and the individual end unit or exit sign corresponding to the end unit reporting so the user knows from the message where to find the exit sign having a low battery.

In some embodiments, addresses to receive notice from a low battery event are designated on a control application wide basis so that these recipient addresses receive notice of any exit low battery for battery group.

In some embodiments, the battery power monitoring group can be configured to monitor for any power level event such as a power spike, power above a predefined limit, power below a predefined limit, etc. Therefore, notifications can be sent to designated addresses in the corresponding group resulting from such events.

In some embodiments, the end unit has multiple battery power sensor ports for monitoring multiple batteries in exit signs or other devices. In some embodiments, multiple batteries are connected to the single battery power sensor port 162g. In some embodiments, the end unit does not have a dimming control function but only has a battery power sensor function.

It will be appreciated the control device may have one or more than one sensing or controlling functions, such as a light dimming control function, a motion sensor detection function, a wall dimmer signal and control function, an exit sense function, battery power detecting function, and/or other functions corresponding to sensors described herein.

Cloud Backup and Control

In some embodiments, the control application 101 and the database 103 are periodically backed up to a remote computer 132. The remote computer can be provided by a cloud computing service. The remote computer 132 is connected to the system computer 102 via a network 130 including the Internet. If the system computer 102 is damaged, down, or destroyed, the system can operate from the application and database(s) running on the remote computer. The remote computer will instruct the gateway that the remote computer is in control and the gateway will communicate to the end units in the network 110 that the remote computer is controlling.

Remote access points 134, 136, such as computer, tables, mobile phones, may interface with the remote computer providing the same or similar functionality as is shown in FIGS. 5-26 and 28-30. The remote access point 134, 126 may connect to the remote computer across a network 130, such as the Internet. The remote computer will periodically check to see if the system computer 102 and the application 101 are back online. If the application 101 is back online on the system computer, the remote computer will instruct the gateway and the end units that the system computer is now in control. The remote computer will update the system computer with any changes in schedules that occurred when the system computer was not in control.

Emergency Group

In some embodiments, input control panel 440 has an emergency tab (not shown). When the emergency tab is selected the system displays, in the window 460, the interface objects corresponding to control devices that are in an emergency group corresponding to the emergency group selected and shown in the title area 458. When a user selects the add button 452, when the emergency tab is shown/selected, the system will display an add emergency alert group window 591 of FIG. 28. The emergency alert group window 591 comprises a trigger signal dial 593, a emergency alert enable/disable dial 595, a duration timer area 597 having an hours dial 598 and a minutes dial 600, a flash rate area 602 having an on time dial 604 and an off time dial 608, a intensity on dial 610, a group name field 612, a comments field 614, a save button 616, a cancel button 618, and a lower emergency group table 620. The emergency group is for designating lights to flash or be illuminated and/or for sending an electronic message(s) across a networks, such as network 130, to a person or one or more first responders.

To create an emergency group, the user will enter an emergency group name in the group name field 614. The user will enter any comments in the comment field 614. The user will select whether a high or low signal indicates whether the emergency condition exists using the trigger signal selector 529. The user will select enable in the alert enable/disable dial 595 to enable the emergency group. In the duration timer area 597, the user will select how long the lights will operate according to the emergency group instructions before going back to normal operations or the operating condition that existed before the emergency alert triggered.

The user will set the hours duration at the hours dial 589 and the minutes duration at the minutes dial 600. In the flash rate area 602 the user will set the flash frequency for the lights. The on time dial 604 sets how long the lights will be on in a cycle. The off time dial 608 sets how long the lights will be off in a cycle.

Figure 28:
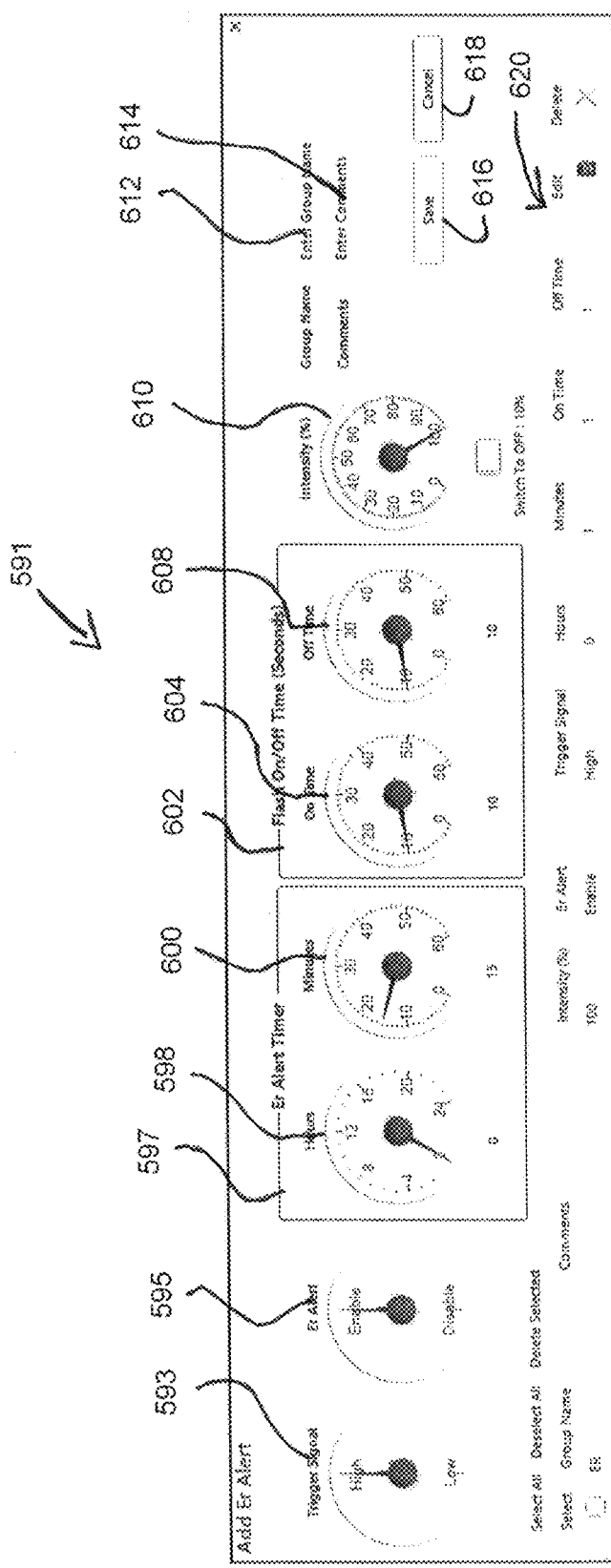
FIG. 28 is an add emergency alert group window of the control application.

In FIG. 28, the dials 604, 608 are set so that the lights will be on 9 seconds, then will be off 9 seconds, then will be on 9 seconds, then will be off 9 seconds, etc. The 9 seconds on and 9 seconds off cycle frequency will continue 15 minutes according to the settings indicated in the duration timer area 597. At the intensity dial, the user will set the intensity that the lights will operate during the on time portion of the cycle. The user will select the save button 616 to save the exit group to the exit sense group table 520.

Manual Scheduling

Figure 29:
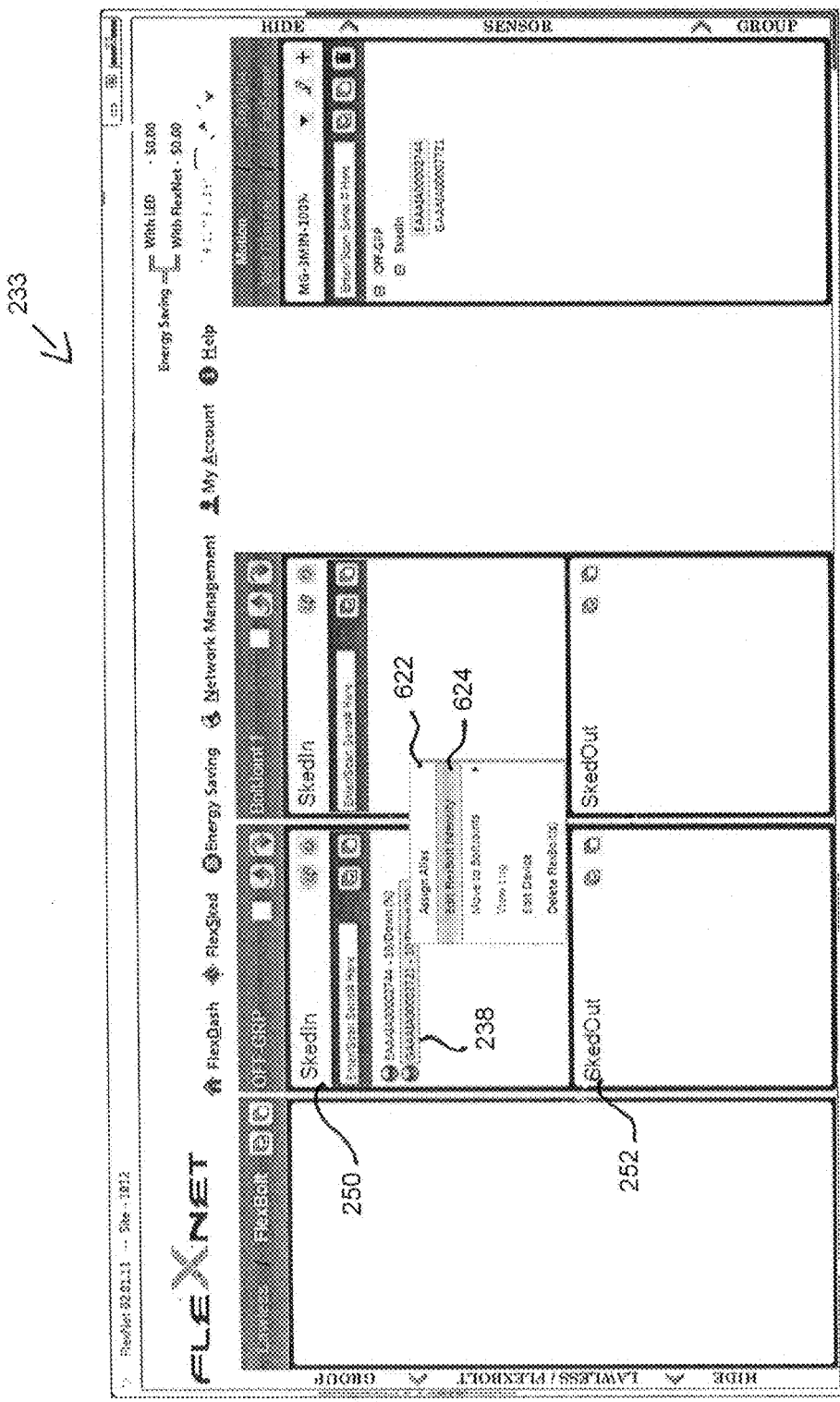
FIG. 29 is a tenth variation of the screen view of a scheduling screen of the lighting control application.
Figure 30:
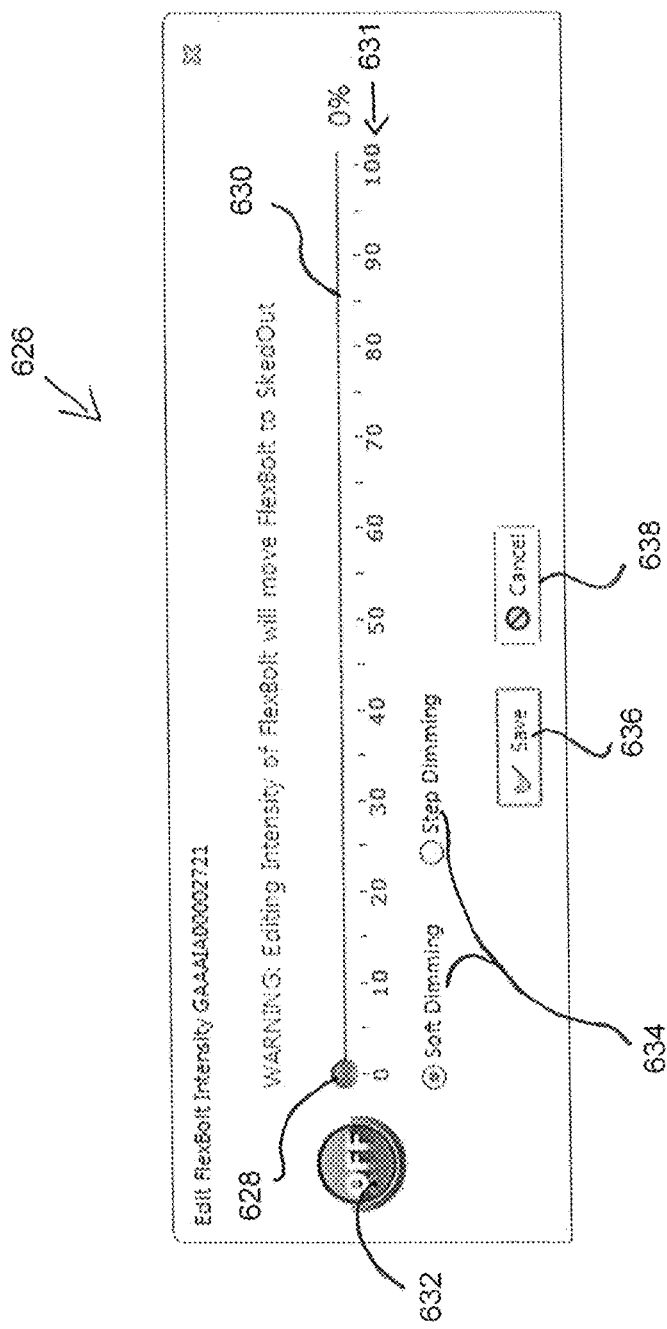
FIG. 30 a manual lighting control window of the control application.

Each control device, such as the control device corresponding to interface object 238 can be set to manual operation. FIGS. 29-30 show the manual setting screens. A user right clicks on the interface object 238 and the context menu 622 appears having an edit flexbolt intensity option 624. When the edit flexbolt intensity option 624 is selected, an edit flexbolt intensity window 626 opens. In the window 626, the user can set the light intensity for the control device by moving a slide button 628 along slide track 630 to the intensity desired at the intensity indicators 631. The user can also turn the light off by electing the off button 632, which will move the slide button to zero percent intensity. The user can select soft dimming or step dimming to make the transition between the current intensity and the intensity set on the slide track. When the user selects save 636, the interface object 236 will move from the in-schedule window 250 to the out-of-schedule window 252. The corresponding control device will be provided with instructions to operate at the user selected manual intensity. The device will then instruct or operate connected lighting at that manual intensity, until the interface object corresponding to the device is put into a schedule such as corresponding to in-schedule window 250.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A computer implemented method of lighting control, comprising the steps of:
displaying a graphical user interface to a user on a display in signal communication with a computer system, the graphical user interface comprising a plurality of lighting control schedule areas, each lighting control schedule area comprising an in-schedule portion and a corresponding out-of-schedule portion, the out-of-schedule portion corresponding to an out-of-schedule lighting control schedule comprising a light intensity setting, the in-schedule portion corresponding to an in-schedule lighting control schedule comprising a plurality of light intensity settings;
associating a one or more interface objects, corresponding to one or more lighting control devices, with the in-schedule lighting control schedule of a first lighting control schedule area of the plurality of lighting control schedule areas without instructing the corresponding one or more lighting control devices to operate on said in-schedule lighting control schedule, in response to the user moving the one or more interface objects to the out-of-schedule portion of the first lighting control schedule area;
instructing the one or more lighting control devices corresponding to the one or more interface objects located in the out-of-schedule portion of the first lighting control schedule area to operate on a first out-of-schedule lighting control schedule in response to said one or more interface objects being moved to the out-of-schedule portion.

2. The method of claim 1, wherein the step of instructing comprises the step of sending an electronic scheduling message to the one or more lighting control devices corresponding to the one or more interface objects located in the out-of-schedule portion with instructions to operate on the out-of-schedule lighting control schedule.

3. The method of claim 1, comprising the step of instructing the one or more lighting control devices to operate on the in-schedule lighting control schedule of the first lighting control schedule area in response to the user moving the one or more interface objects to the in-schedule portion of the first lighting control schedule area.

4. The method of claim 1, comprising the step of associating one or more second interface objects, corresponding to one or more lighting second control devices, with the in-schedule lighting control schedule of a second lighting control schedule area of the plurality of lighting control schedule areas without instructing the corresponding one or more lighting control devices to operate on said in-schedule lighting control schedule in response to the user moving the one or more interface objects to the out-of-schedule portion of the second lighting control schedule area.

5. The method of claim 1, wherein the step of associating is further defined in that at least one of the interface objects are moved into the out-of-schedule portion in response to the user entering an ID into a text entry box, the ID corresponding at least one of the one or more lighting control devices.

6. The method of claim 1, wherein the step of associating is further defined in that at least one of the interface objects are moved into the out-of-schedule portion in response to the user selecting, dragging, and dropping the one or more interface objects into the out-of-schedule portion of the first lighting control schedule area.

7. The method of claim 1, wherein the step of associating comprises the step of associating all of the interface objects in the in-schedule lighting control schedule of the first lighting control schedule area with the in-schedule lighting control schedule without instructing the corresponding one or more lighting control devices to operate on said in-schedule lighting control schedule, in response to the user moving all of the interface objects to the out-of-schedule portion of the first lighting control schedule area, wherein the user moving all of the interface objects is accomplished by one user action.

8. The method of claim 1, further comprising the step of associating all of the interface objects in the in-schedule lighting control schedule of each of the plurality of lighting control schedule areas with the corresponding in-schedule lighting control schedule without instructing the corresponding one or more lighting control devices to operate on said corresponding in-schedule lighting control schedule in response to the user instructing to move all of the interface objects to the corresponding out-of-schedule portion of the corresponding lighting control schedule areas.

9. The method of claim 1, wherein the step of claim 1 wherein the step of associating the one or more interface objects is further defined in that each of the plurality of lighting control schedule areas comprises a lighting control window, each in-schedule portion is an in-schedule window, and each out-of-schedule portion is an out-of-schedule window; the one or more interface objects, corresponding to the one or more lighting control devices, are associated with the in-schedule lighting control schedule of the first lighting control schedule area of the plurality of lighting control schedule areas without instructing the corresponding one or more lighting control devices to operate on said in-schedule lighting control schedule, in response to the user moving the one or more interface objects to the out-of-schedule window of the first lighting control schedule area.

10. A lighting control computer system, comprising:
a processor;
a memory comprising a plurality of lighting control schedules, the memory is in signal-communication with the processor;
a display in signal-communication with the processor;
a graphical user interface display function stored on the memory and executable by the processor to display a graphical user interface on the display, the graphical user interface comprising a plurality of lighting control schedule areas, each scheduling area comprising an in-schedule portion and a corresponding out-of-schedule portion, each in-schedule portion corresponding to at least one of the plurality of lighting control schedules, each out-of-schedule portion corresponding to an out-of-schedule lighting control schedule;
an associating function stored on the memory and executable by the processor to associate a one or more interface objects, corresponding to one or more lighting control devices, with one of the plurality of lighting control schedules without instructing the corresponding one or more lighting control devices to operate on said one of the plurality of lighting control schedules, in response to a user moving the one or more interface objects to the corresponding out-of-schedule portion.

11. The system of claim 10, comprising,
an out-of-schedule function stored on the memory and executable by the processor to instruct the one or more lighting control devices corresponding to the one or more interface objects located in the out-of-schedule portion to operate on the out-of-schedule lighting control schedule in response to said one or more interface objects being moved by the user into the corresponding out-of-schedule portion from the in-schedule portion; and,
a move in-schedule function stored on the memory and executable by the processor to instruct the one or more lighting control devices corresponding to the one or more interface objects located in the in-schedule portion to operate on the corresponding in-schedule lighting control schedule, of the plurality of lighting control schedules, in response to said interface objects being moved by the user into the in-schedule portion from the corresponding out-of-schedule portion.

12. The system of claim 10, wherein the associating function is configured to instruct the one or more lighting control devices corresponding to the one or more interface objects located in the out-of-schedule portion of the corresponding lighting control schedule area to operate on the corresponding out-of-schedule lighting control schedule in response to said interface objects being moved into the corresponding out-of-schedule portion from the in-schedule portion.

13. The system of claim 12, wherein the associating function is configured to send an electronic scheduling message to the one or more lighting control devices corresponding to the one or more interface objects located in the out-of-schedule portion with instructions to operate on the corresponding out-of-schedule lighting control schedule.

14. The system of claim 10, comprising an in-schedule operations function stored on the memory and executable by the processor to instruct the one or more lighting control devices to operate on the corresponding in-schedule lighting control schedule, of the plurality of lighting control schedules, in response to the user moving the one or more interface objects to the in-schedule portion of the corresponding lighting control schedule area.

15. The system of claim 10, comprising a drag-and-drop interface function stored on the memory and executable by the processor to recognize user drag and drop gestures in the graphical user interface; and the associating function is further defined in that at least one of the interface objects are moved into the out-of-schedule portion in response to the user selecting, dragging, and dropping the one or more interface objects into the out-of-schedule portion.

16. The system of claim 10, wherein the associating function is further configured to associate all of the interface objects in the in-schedule portion of a given lighting control schedule area, of the plurality of lighting control schedule areas, with a corresponding lighting control schedule of the plurality of lighting control schedules without instructing the corresponding one or more lighting control devices to operate on the corresponding lighting control schedule, in response to the user moving all of the interface objects to the out-of-schedule portion of the given lighting control schedule area, wherein the user moving all of the interface objects is accomplished by one user action.

17. The system of claim 10, wherein the associating function is further configured to associate all of the interface objects in the in-schedule portion of each of the plurality of lighting control schedule areas with the corresponding in-schedule lighting control schedule without instructing the corresponding one or more lighting control devices to operate on the corresponding in-schedule lighting control schedule, in response to the user instructing to move all of the interface objects to the corresponding out-of-schedule portion of the corresponding lighting control schedule areas of the plurality of lighting control schedule areas.

18. The system of claim 10, comprising a manual intensity function stored on the memory and executable by the processor to move an interface object of the one or more interface objects to the corresponding out-of-schedule portion in response to the user setting a manual intensity for the corresponding lighting control device.

19. The system of claim 10, wherein each of the plurality of lighting control schedule areas comprises a lighting control window, each in-schedule portion is an in-schedule window, and each out-of-schedule portion is an out-of-schedule window.

20. A graphical user interface on a display of a computer system with a memory, and one or more processors to execute one or more programs stored in the memory, the graphical user interface comprising:
a first out-of-schedule area corresponding to a first out-of-schedule lighting control schedule comprising a first light intensity setting;
a first in-schedule area corresponding to a first in-schedule lighting control schedule comprising a first plurality of light intensity settings;
a second out-of-schedule area corresponding to a second out-of-schedule lighting control schedule comprising a second light intensity setting;

a second in-schedule area corresponding to a second in-schedule lighting control schedule comprising a second plurality of light intensity settings;

wherein,
in response to a user moving a one or more interface objects representing a one or more lighting control devices into the first or second out-of-schedule areas, associating the one or more lighting control devices corresponding to the one or more interface objects with the corresponding first or second in-schedule lighting control schedules.

\* \* \* \* \*